United States Patent
Rawas et al.

(10) Patent No.: US 11,529,741 B2
(45) Date of Patent: Dec. 20, 2022

(54) SYSTEM AND METHOD FOR POSITIONING ONE OR MORE ROBOTIC APPARATUSES

(71) Applicant: DIVERGENT TECHNOLOGIES, INC., Los Angeles, CA (US)

(72) Inventors: Oussama Rawas, Allen, TX (US); Lukas Philip Czinger, Santa Monica, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 139 days.

(21) Appl. No.: 16/222,981

(22) Filed: Dec. 17, 2018

(65) Prior Publication Data

US 2020/0189114 A1    Jun. 18, 2020

(51) Int. Cl.
*B25J 9/16*   (2006.01)
*B25J 9/00*   (2006.01)

(52) U.S. Cl.
CPC ........... *B25J 9/1697* (2013.01); *B25J 9/0087* (2013.01); *B25J 9/1669* (2013.01); *B25J 9/1682* (2013.01); *B25J 9/1687* (2013.01); G05B 2219/39114 (2013.01); G05B 2219/39129 (2013.01);
(Continued)

(58) Field of Classification Search
CPC ...... B25J 9/1697; B25J 9/0084; B25J 9/0087; B25J 9/009; B25J 9/1669; B25J 9/1682; B25J 19/023; B25J 9/1687; G05B 2219/39114; G05B 2219/39129; G05B 2219/39149; G05B 2219/39394; G05B 2219/40605; G05B 2219/40033; G05B 2219/40487

See application file for complete search history.

(56) References Cited

U.S. PATENT DOCUMENTS

| 5,148,591 A | 9/1992 | Pryor |
| 5,203,226 A | 4/1993 | Hongou et al. |
| 5,742,385 A | 4/1998 | Champa |

(Continued)

FOREIGN PATENT DOCUMENTS

| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)
(Continued)

*Primary Examiner* — Spencer D Patton
(74) *Attorney, Agent, or Firm* — ArentFox Schiff LLP

(57) ABSTRACT

An approach to positioning one or more robotic arms in an assembly system may be described herein. For example, an apparatus may include a first robotic arm having a distal end and a proximal end. The distal end may be configured for movement and the proximal end may secure the first robotic arm. The apparatus may further include a camera connected with the distal end of the first robotic arm. The camera may be configured to capture image data of a marker connected with a second robotic arm and provide the image data to a computer. The computer may generate a set of instructions for the first robotic arm based on the image data of the marker. The movement of the first robotic arm may be caused by the computer according to the generated set of instructions.

20 Claims, 9 Drawing Sheets

(52) U.S. Cl.
CPC .............. *G05B 2219/39149* (2013.01); *G05B 2219/39394* (2013.01); *G05B 2219/40605* (2013.01)

(56) References Cited

U.S. PATENT DOCUMENTS

| | | | |
|---|---|---|---|
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,514,018 B2 | 2/2003 | Martinez et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,644,897 B2 | 11/2003 | Martinez et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,344,186 B1 | 3/2008 | Hausler et al. | |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |
| 9,724,881 B2 | 8/2017 | Johnson et al. | |
| 9,725,178 B2 | 8/2017 | Wang | |
| 9,731,730 B2 | 8/2017 | Stiles | |
| 9,731,773 B2 | 8/2017 | Garni et al. | |
| 9,741,954 B2 | 8/2017 | Bruder et al. | |
| 9,747,352 B2 | 8/2017 | Karmarkar | |
| 9,764,415 B2 | 9/2017 | Seufzer et al. | |
| 9,764,520 B2 | 9/2017 | Johnson et al. | |
| 9,765,226 B2 | 9/2017 | Dain | |
| 9,770,760 B2 | 9/2017 | Liu | |
| 9,773,393 B2 | 9/2017 | Velez | |
| 9,776,234 B2 | 10/2017 | Schaalliausen et al. | |
| 9,782,936 B2 | 10/2017 | Glunz et al. | |
| 9,783,324 B2 | 10/2017 | Embler et al. | |
| 9,783,977 B2 | 10/2017 | Alqasimi et al. | |
| 9,789,548 B2 | 10/2017 | Golshany et al. | |
| 9,789,922 B2 | 10/2017 | Dosenbach et al. | |
| 9,796,137 B2 | 10/2017 | Zhang et al. | |
| 9,802,108 B2 | 10/2017 | Aders | |
| 9,809,977 B2 | 11/2017 | Carney et al. | |
| 9,817,922 B2 | 11/2017 | Glunz et al. | |
| 9,818,071 B2 | 11/2017 | Jung et al. | |
| 9,821,339 B2 | 11/2017 | Paschkewitz et al. | |
| 9,821,411 B2 | 11/2017 | Buller et al. | |

(56) References Cited

U.S. PATENT DOCUMENTS

| | | |
|---|---|---|
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |

(56) References Cited

U.S. PATENT DOCUMENTS

| | | | |
|---|---|---|---|
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2013/0010081 A1 | 1/2013 | Tenney et al. |
| 2014/0107841 A1 | 4/2014 | Danko |
| 2014/0277669 A1 | 9/2014 | Nardi et al. |
| 2016/0125594 A1 | 5/2016 | Becker et al. |
| 2017/0113344 A1 | 4/2017 | Schönberg |
| 2017/0336774 A1* | 11/2017 | Freeman | G05B 11/01 |
| 2017/0341309 A1 | 11/2017 | Piepenbrock et al. |
| 2018/0021944 A1* | 1/2018 | Schreiber | B25J 9/0084 700/248 |
| 2018/0087910 A1* | 3/2018 | Salehi | H04W 4/02 |

FOREIGN PATENT DOCUMENTS

| | | | |
|---|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | WO-2014161603 A1 * | 10/2014 | ............ B25J 9/1692 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | WO-2016119829 A1 * | 8/2016 | ............ B25J 9/1682 |
| WO | 2017036461 A1 | 3/2017 |
| WO | WO2018/063100 A2 * | 4/2018 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
CADlearning, "Understanding the Difference Between BIM and CAD", accessed 2021, https://knowledge.autodesk.com/support/revit-products/learn-explore/caas/video/youtube/lesson/143344-courseld-100332.html (Year: 2021).*
Jorge Corona-Gastuera et al,; "An Approach for Intelligent Fixtureless Assembly: Issues and Experiments;" A. Gelbukh, A. de Albornoz, and H. Terashima (Eds.): MICAI 2005, LNAI 3789, pp. 1052-1061, 2005. © Springer-Verlag Berlin Heidelberg 2005.
Bone, G. and Capson D., "Vision-Guided fixtureless Assembly of Automotive Components", Robotics and Computer Integrated Manufacturing, vol. 19, pp. 79-87, 2003. DOI: 10.1016/S0736-5845(02)00064-9.
Ogun, P. et al., 2015. "3D Vision Assisted Flexible Robotic Assembly of Machine Components." IN: Proceedings of 2015 8th International Conference on Machine Vision (ICMV 2015), Barcelona, spain, Nov. 19-21, 2015 (Proceedings of SPIE, 9878, DOI: 10.1117/12.2229053).
James K. Mills et al., "Robotic Fixtureless Assembly of Sheet Metal Parts Using Dynamic Finite Element Models: Modelling and Stimulation." Laboratory for Nonlinear Systems Control, Department of Mechanical Engineering, University of Toronto, 5 King's College Road, Toronto, Ontario, Canada M5S 1A4. IEEE International Conference on Robotics and Automation 0-7803-1965-6/95 $4.00 © 1995 IEEE.
International Search Report & Written Opinion received in PCT/US2019/066820 dated Mar. 3, 2020.
First Office Action received in Chinese Patent Application No. 201922270352.X, dated Jul. 14, 2020.
Extended European Search Report in EP19899837, dated Aug. 17, 2022, 11 pages.

* cited by examiner

SYSTEM AND METHOD FOR POSITIONING ONE OR MORE ROBOTIC APPARATUSES

BACKGROUND

Field

The present disclosure relates to robotic apparatuses, and more specifically to techniques for generating instructions to control movement of robotic apparatuses.

Background

A transport structure such as an automobile, truck or aircraft employs a large number of interior and exterior nodes. These nodes provide structure to the automobile, truck and aircraft, and respond appropriately to the many different types of forces that are generated or that result from various actions like accelerating and braking. These nodes also provide support. Nodes of varying sizes and geometries may be integrated in a transport structure, for example, to provide an interface between panels, extrusions, and/or other structures. Thus, nodes are an integral part of transport structures.

Most nodes must be coupled to, or interface securely with, another part or structure in secure, well-designed ways. In order to securely connect a node with another part or structure, the node may need to undergo one or more processes in order to prepare the node to connect with the other part or structure. For example, the node may be machined at an interface in order to connect with various other parts or structures. Further examples of processes include surface preparation operations, heat treatment, electrocoating, electroplating, anodization, chemical etching, cleaning, support removal, powder removal, and so forth.

In order to produce a transport structure (e.g., a vehicle, an aircraft, a metro system, etc.), one or more assembly operations may be performed after a node is constructed. For example, a node may be connected with a part, e.g., in order to form a portion of a transport structure (e.g., a vehicle chassis, etc.). Such assembly may involve a degree of accuracy that is within one or more tolerance thresholds of an assembly system, e.g., in order to ensure that the node is securely connected with the part and, therefore, the transport structure may be satisfactorily produced.

When robotic apparatuses (e.g., robotic arms) perform assembly operations, the robotic apparatuses are to be accurately positioned in order for the assembly operations to be accurately performed. For example, a robotic arm with which a node is engaged may be positioned so that the node is accurately connected with a part. Thus, a need exists for an approach to correctly positioning at least one robotic apparatus (e.g., a robotic arm) with a degree of precision that is within tolerance threshold(s) of an assembly system when performing various assembly operations.

SUMMARY

The present disclosure generally relates to assembly operations performed in association with production of transport structures. Such assembly operations may include connection of nodes (e.g., additively manufactured nodes) with parts and/or other structures. Because transport structures are to be safe, reliable, and so forth, approaches to accurately performing various assembly operations associated with production of transport structures may be beneficial. Such approaches to various assembly operations may be performed by at least one robotic arm that may be instructed via computer-generated instructions. Accordingly, a computer may implement various techniques to generate instructions for at least one robotic arm that causes the at least one robotic arm to be correctly position when performing various assembly operations.

In the present disclosure, systems and apparatuses for positioning a robotic arm may be described. In one aspect, a first apparatus may comprise a first robotic arm having a distal end and a proximal end, and the distal end may be configured for movement while the proximal end may secure the first robotic arm. The first apparatus may include a camera connected with the distal end of the first robotic arm, and the camera may be configured to capture image data of a marker connected with a second robotic arm and provide the image data to a computer. The movement of the first robotic arm may be caused by the computer based on the image data of the marker.

In another aspect, a first system for positioning a robotic arm may be described. The first system may comprise a first robotic arm having a first camera disposed on a first distal end. The system may include a first controller connected with the first robotic arm and the first controller may be configured to cause movement of the first robotic arm. The system may include a second robotic arm having a second marker disposed on a second distal end. The first camera may be positioned such that the second marker is within a field of view of the first camera, and the first camera may be configured to capture first image data of the second marker and provide the first image data to a computer. The first controller may be configured to cause movement of the first robotic arm based on instructions obtained from the computer. In various aspects, the system may further include a second controller connected with the second robotic arm, and the second controller may be configured to cause movement of the second robotic arm. The first robotic arm may include a first marker disposed on the first distal end and the second robotic arm may include a second camera disposed on the second distal end. The second camera may be configured to capture second image data of the first marker and provide the second image data to the computer, and the second controller may be configured to cause the movement of the second robotic arm based on instructions obtained from the computer.

In another aspect, a second apparatus for positioning a robotic arm may be described.

The second apparatus may include a memory and at least one processor coupled to the memory and configured to obtain, from a first camera disposed on a first robotic arm, first image data of a second marker disposed on a second robotic arm. The at least one processor may be further configured to generate a first set of instructions associated with causing connection of a first part engaged by the first robotic arm to a second part engaged by the second robotic arm. The at least one processor may be further configured to provide the first set of instructions to a first controller connected with the first robotic arm, and the first set of instructions may cause first movement of the first robotic arm in association with the connection of the first part to the second part. In some embodiments, the first image data may further include data of a fixed marker, and the first set of instructions may be based on the fixed marker as a reference point.

It will be understood that other aspects of mechanisms for realizing adhesive connections with additively manufactured components and the manufacture thereof will become readily apparent to those skilled in the art from the following detailed description, wherein it is shown and described only several embodiments by way of illustration. As will be realized by those skilled in the art, the disclosed subject matter is capable of other and different embodiments and its several details are capable of modification in various other respects, all without departing from the invention. Accordingly, the drawings and detailed description are to be regarded as illustrative in nature and not as restrictive.

DETAILED DESCRIPTION

Figure 1:
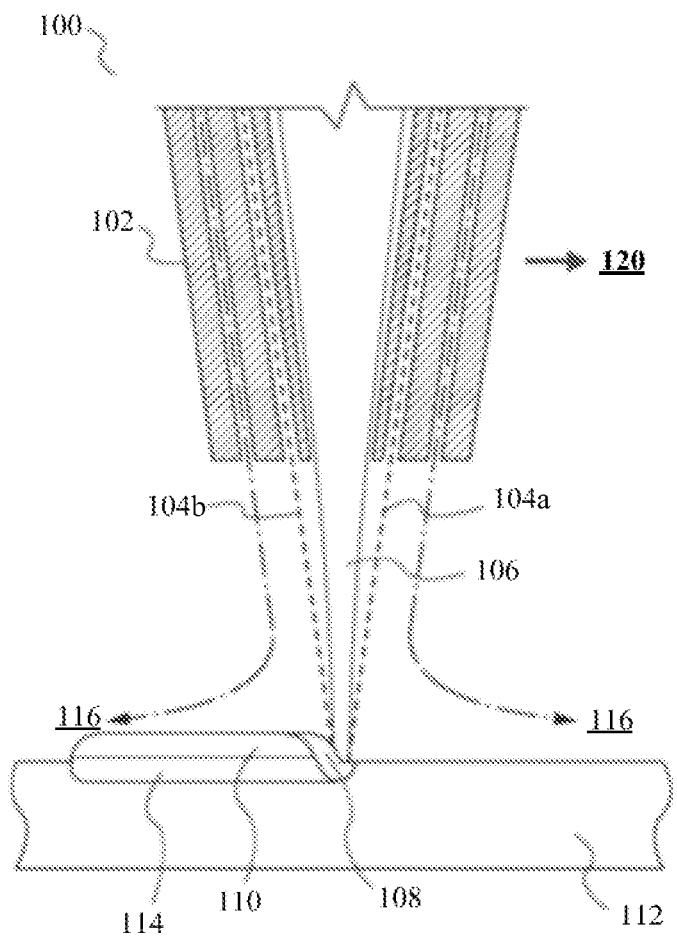
FIG. 1 illustrates an exemplary embodiment of certain aspects of a Direct Metal Deposition (DMD) 3-D printer.

The detailed description set forth below in connection with the appended drawings is intended to provide a description of various exemplary embodiments and is not intended to represent the only embodiments in which the invention may be practiced. The terms "exemplary," "illustrative," and the like used throughout the present disclosure mean "serving as an example, instance, or illustration," and should not necessarily be construed as preferred or advantageous over other embodiments presented in the present disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout the present disclosure. In addition, the figures may not be drawn to scale and instead may be drawn in a way that attempts to most effectively highlight various features relevant to the subject matter described.

Additive Manufacturing (3-D Printing).

Additive manufacturing (AM) is advantageously a non-design specific manufacturing technique. AM provides the ability to create complex structures within a part. For example, nodes can be produced using AM. A node is a structural member that may include one or more interfaces used to connect to other spanning components such as tubes, extrusions, panels, other nodes, and the like. Using AM, a node may be constructed to include additional features and functions, depending on the objectives. For example, a node may be printed with one or more ports that enable the node to secure two parts by injecting an adhesive rather than welding multiple parts together, as is traditionally done in manufacturing complex products. Alternatively, some components may be connected using a brazing slurry, a thermoplastic, a thermoset, or another connection feature, any of which can be used interchangeably in place of an adhesive. Thus, while welding techniques may be suitable with respect to certain embodiments, additive manufacturing provides significant flexibility in enabling the use of alternative or additional connection techniques.

A variety of different AM techniques have been used to 3-D print components composed of various types of materials. Numerous available techniques exist, and more are being developed. For example, Directed Energy Deposition (DED) AM systems use directed energy sourced from laser or electron beams to melt metal. These systems utilize both powder and wire feeds. The wire feed systems advantageously have higher deposition rates than other prominent AM techniques. Single Pass Jetting (SPJ) combines two powder spreaders and a single print unit to spread metal powder and to print a structure in a single pass with apparently no wasted motion. As another illustration, electron beam additive manufacturing processes use an electron beam to deposit metal via wire feedstock or sintering on a powder bed in a vacuum chamber. Single Pass Jetting is another exemplary technology claimed by its developers to be much quicker than conventional laser-based systems. Atomic Diffusion Additive Manufacturing (ADAM) is still another recently developed technology in which components are printed, layer-by-layer, using a metal powder in a plastic binder. After printing, plastic binders are removed and the entire part is sintered at once into a desired metal.

One of several such AM techniques, as noted, is DMD. FIG. 1 illustrates an exemplary embodiment of certain aspects of a DMD 3-D printer 100. DMD printer 100 uses feed nozzle 102 moving in a predefined direction 120 to propel powder streams 104a and 104b into a laser beam 106, which is directed toward a workpiece 112 that may be supported by a substrate. Feed nozzle may also include mechanisms for streaming a shield gas 116 to protect the welded area from oxygen, water vapor, or other components.

The powdered metal is then fused by the laser 106 in a melt pool region 108, which may then bond to the workpiece 112 as a region of deposited material 110. The dilution area 114 may include a region of the workpiece where the deposited powder is integrated with the local material of the workpiece. The feed nozzle 102 may be supported by a computer numerical controlled (CNC) robot or a gantry, or other computer-controlled mechanism. The feed nozzle 102 may be moved under computer control multiple times along a predetermined direction of the substrate until an initial layer of the deposited material 110 is formed over a desired area of the workpiece 112. The feed nozzle 102 can then scan the region immediately above the prior layer to deposit successive layers until the desired structure is formed. In general, the feed nozzle 102 may be configured to move with respect to all three axes, and in some instances to rotate on its own axis by a predetermined amount.

Figure 2:
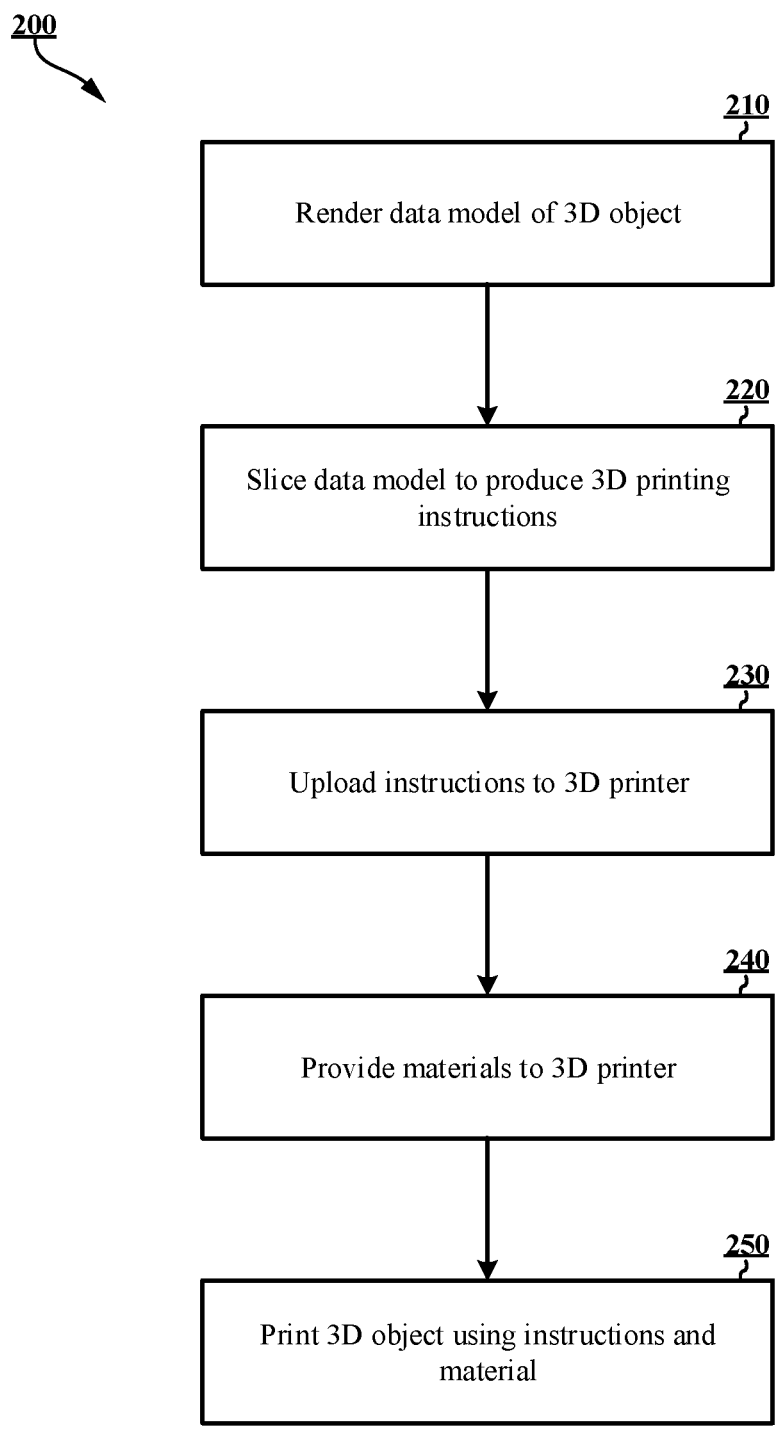
FIG. 2 illustrates a conceptual flow diagram of a 3-D printing process using a 3-D printer.

FIG. 2 is a flow diagram 200 illustrating an exemplary process of 3-D printing. A data model of the desired 3-D object to be printed is rendered (operation 210). A data model is a virtual design of the 3-D object. Thus, the data model may reflect the geometrical and structural features of the 3-D object, as well as its material composition. The data model may be created using a variety of methods, including CAE-based optimization, 3D modeling, photogrammetry software, and camera imaging. CAE-based optimization may include, for example, cloud-based optimization, fatigue analysis, linear or non-linear finite element analysis (FEA), and durability analysis.

3-D modeling software, in turn, may include one of numerous commercially available 3-D modeling software applications. Data models may be rendered using a suitable computer-aided design (CAD) package, for example in an STL format. STL is one example of a file format associated with commercially available stereolithography-based CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (operation 220). Numerous slicer programs are commercially available. Generally, the slicer program converts the data model into a series of individual layers representing thin slices (e.g., 100 microns thick) of the object be printed, along with a file containing the printer-specific instructions for 3-D printing these successive individual layers to produce an actual 3-D printed representation of the data model.

The layers associated with 3-D printers and related print instructions need not be planar or identical in thickness. For example, in some embodiments depending on factors like the technical sophistication of the 3-D printing equipment and the specific manufacturing objectives, etc., the layers in a 3-D printed structure may be non-planar and/or may vary in one or more instances with respect to their individual thicknesses.

A common type of file used for slicing data models into layers is a G-code file, which is a numerical control programming language that includes instructions for 3-D printing the object. The G-code file, or other file constituting the instructions, is uploaded to the 3-D printer (operation 230). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (operation 240). In DMD techniques, for example, one or more metal powders may be selected for layering structures with such metals or metal alloys. In selective laser melting (SLM), selective laser sintering (SLS), and other PBF-based AM methods (see below), the materials may be loaded as powders into chambers that feed the powders to a build platform. Depending on the 3-D printer, other techniques for loading printing materials may be used.

The respective data slices of the 3-D object are then printed based on the provided instructions using the material(s) (operation 250). In 3-D printers that use laser sintering, a laser scans a powder bed and melts the powder together where structure is desired, and avoids scanning areas where the sliced data indicates that nothing is to be printed. This process may be repeated thousands of times until the desired structure is formed, after which the printed part is removed from a fabricator. In fused deposition modelling, as described above, parts are printed by applying successive layers of model and support materials to a substrate. In general, any suitable 3-D printing technology may be employed for purposes of the present disclosure.

Another AM technique includes powder-bed fusion ("PBF"). Like DMD, PBF creates 'build pieces' layer-by-layer. Each layer or 'slice' is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up.

FIGS. 3A-D illustrate respective side views of an exemplary PBF system 300 during different stages of operation. As noted above, the particular embodiment illustrated in FIGS. 3A-D is one of many suitable examples of a PBF system employing principles of the present disclosure. It should also be noted that elements of FIGS. 3A-D and the other figures in the present disclosure are not necessarily drawn to scale, but may be drawn larger or smaller for the purpose of better illustration of concepts described herein. PBF system 300 can include a depositor 301 that can deposit each layer of metal powder, an energy beam source 303 that can generate an energy beam, a deflector 305 that can apply the energy beam to fuse the powder, and a build plate 307 that can support one or more build pieces, such as a build piece 309. PBF system 300 can also include a build floor 311 positioned within a powder bed receptacle. The walls of the powder bed receptacle 312 generally define the boundaries of the powder bed receptacle, which is sandwiched between the walls 312 from the side and abuts a portion of the build floor 311 below. Build floor 311 can progressively lower build plate 307 so that depositor 301 can deposit a next layer. The entire mechanism may reside in a chamber 313 that can enclose the other components, thereby protecting the equipment, enabling atmospheric and temperature regulation and mitigating contamination risks. Depositor 301 can include a hopper 315 that contains a powder 317, such as a metal powder, and a leveler 319 that can level the top of each layer of deposited powder.

Figure 3A:
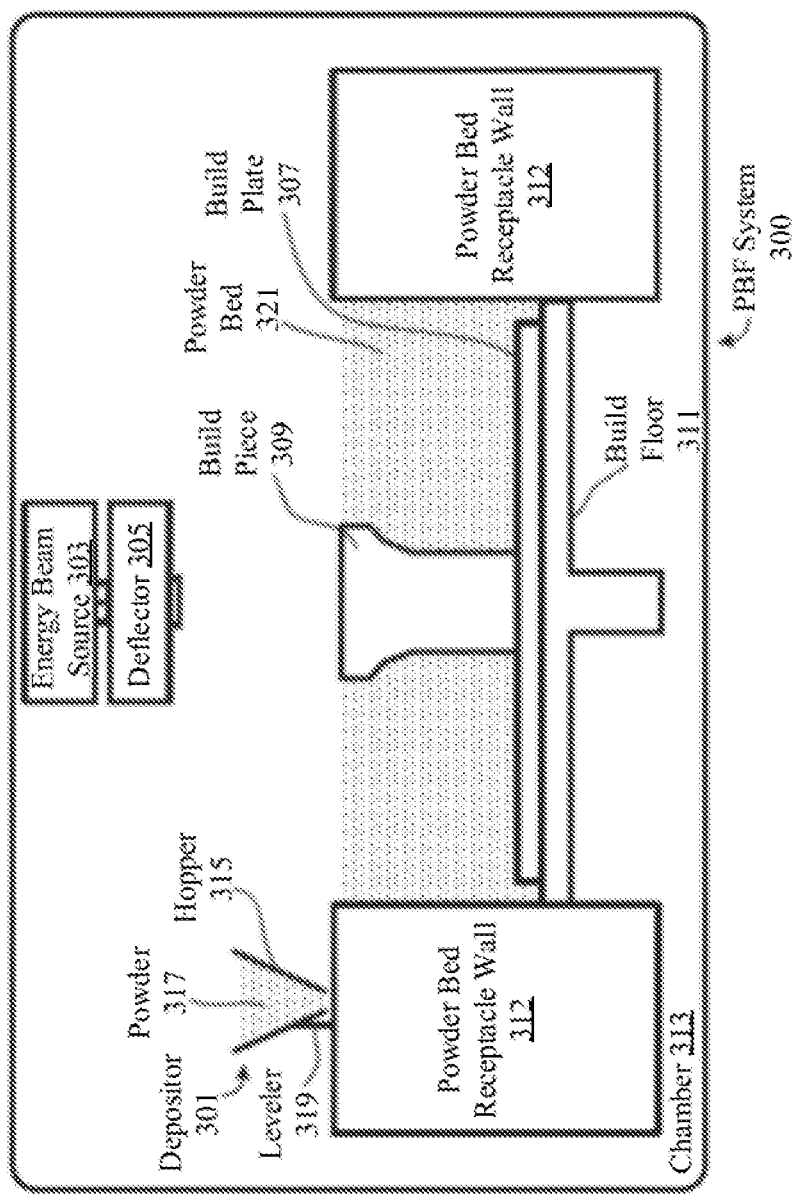
FIGS. 3A-D illustrate exemplary powder bed fusion (PBF) systems during different stages of operation.

Referring specifically to FIG. 3A, this figure shows PBF system 300 after a slice of build piece 309 has been fused, but before the next layer of powder has been deposited. In fact, FIG. 3A illustrates a time at which PBF system 300 has already deposited and fused slices in multiple layers, e.g., 150 layers, to form the current state of build piece 309, e.g., formed of 150 slices. The multiple layers already deposited have created a powder bed 321, which includes powder that was deposited but not fused.

Figure 3B:
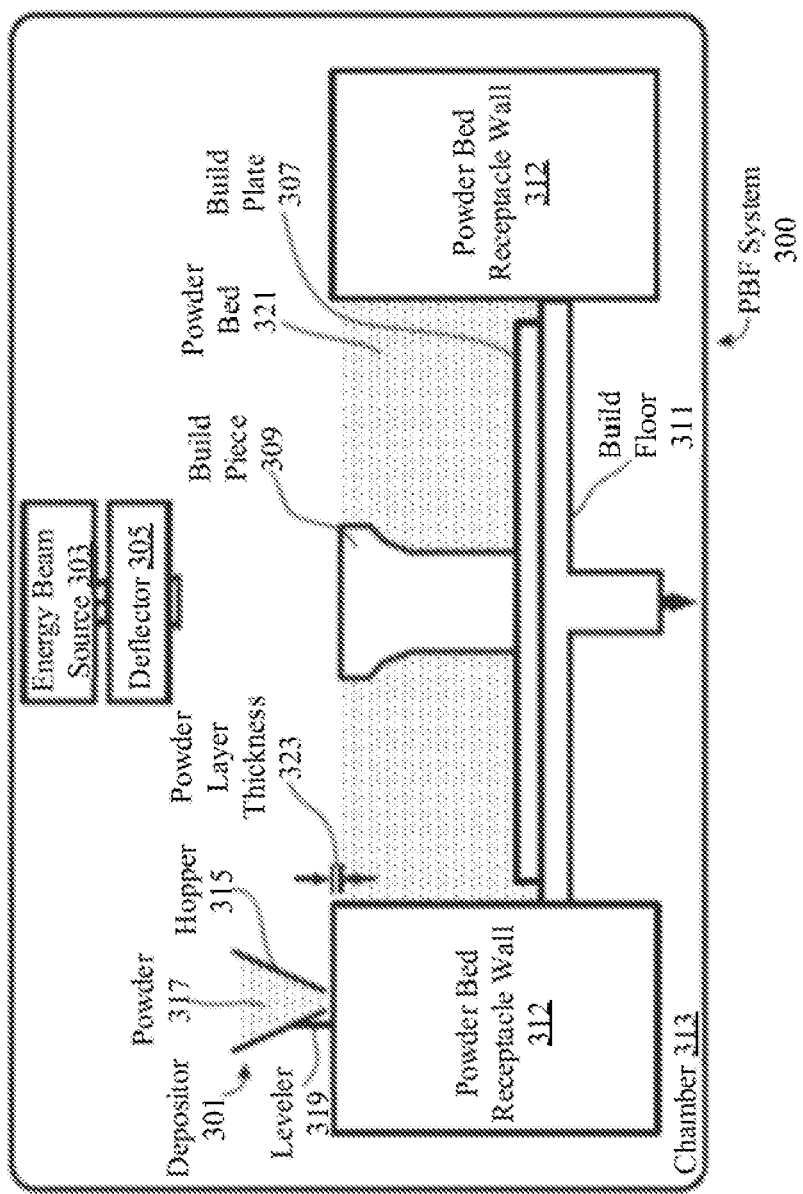

FIG. 3B shows PBF system 300 at a stage in which build floor 311 can lower by a powder layer thickness 323. The lowering of build floor 311 causes build piece 309 and powder bed 321 to drop by powder layer thickness 323, so that the top of the build piece and powder bed are lower than the top of powder bed receptacle wall 312 by an amount equal to the powder layer thickness. In this way, for example, a space with a consistent thickness equal to powder layer thickness 323 can be created over the top of build piece 309 and powder bed 321.

Figure 3C:
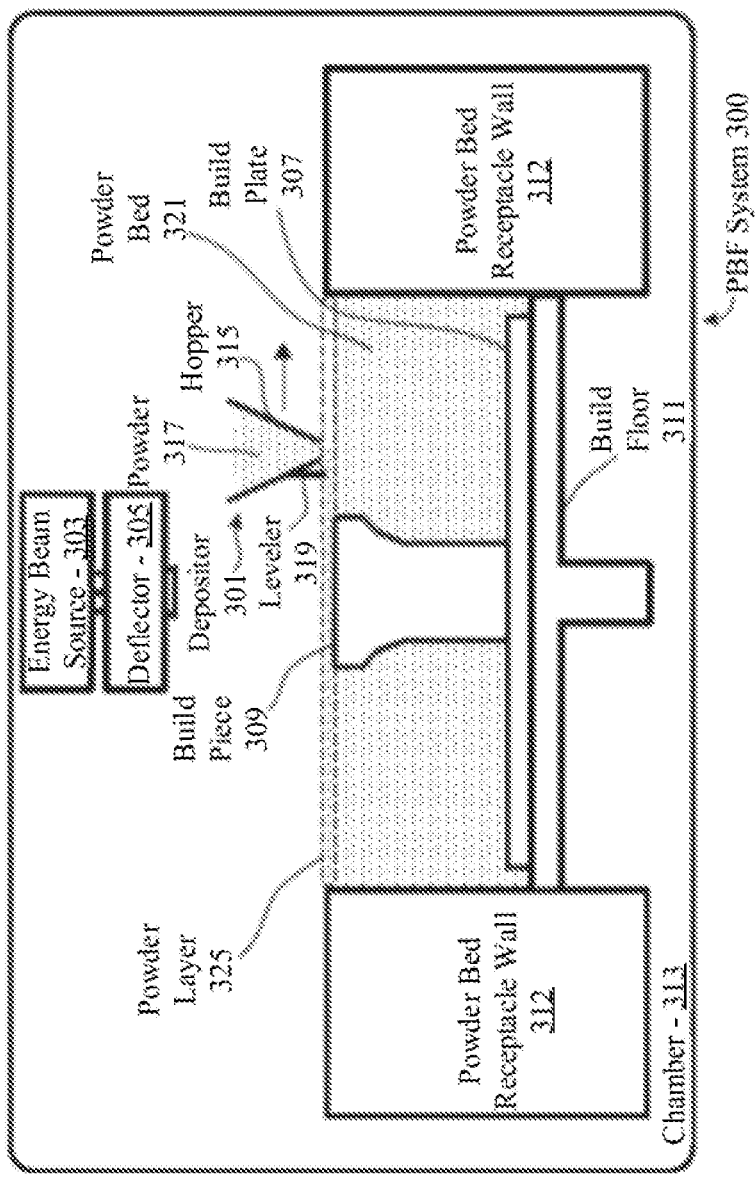

FIG. 3C shows PBF system 300 at a stage in which depositor 301 is positioned to deposit powder 317 in a space created over the top surfaces of build piece 309 and powder bed 321 and bounded by powder bed receptacle walls 312. In this example, depositor 301 progressively moves over the defined space while releasing powder 317 from hopper 315. Leveler 319 can level the released powder to form a powder layer 325 that has a thickness substantially equal to the powder layer thickness 323 (see FIG. 3B). Thus, the powder in a PBF system can be supported by a powder support structure, which can include, for example, a build plate 307, a build floor 311, a build piece 309, walls 312, and the like. It should be noted that the illustrated thickness of powder layer 325 (i.e., powder layer thickness 323 (FIG. 3B)) is greater than an actual thickness used for the example involving 350 previously-deposited layers discussed above with reference to FIG. 3A.

Figure 3D:
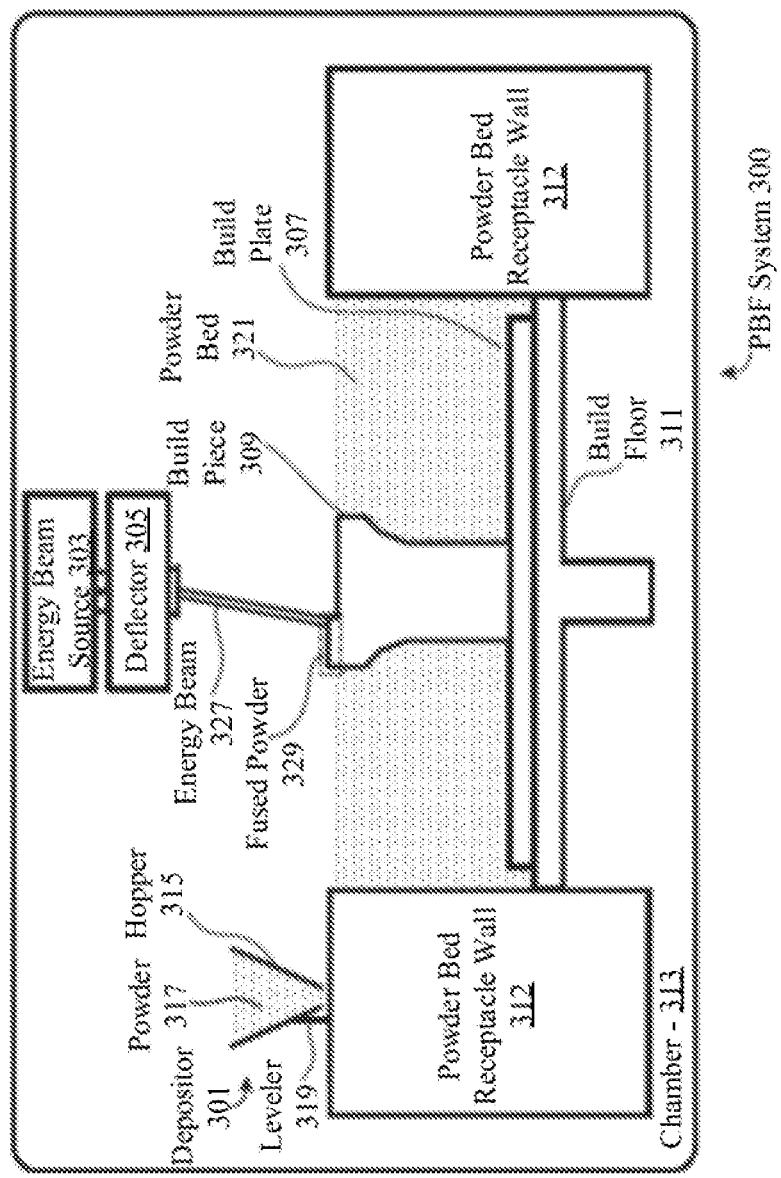

FIG. 3D shows PBF system 300 at a stage in which, following the deposition of powder layer 325 (FIG. 3C), energy beam source 303 generates an energy beam 327 and deflector 305 applies the energy beam to fuse the next slice in build piece 309. In various exemplary embodiments, energy beam source 303 can be an electron beam source, in which case energy beam 327 constitutes an electron beam. Deflector 305 can include deflection plates that can generate an electric field or a magnetic field that selectively deflects the electron beam to cause the electron beam to scan across areas designated to be fused. In various embodiments, energy beam source 303 can be a laser, in which case energy beam 327 is a laser beam. Deflector 305 can include an optical system that uses reflection and/or refraction to manipulate the laser beam to scan selected areas to be fused.

In various embodiments, the deflector 305 can include one or more gimbals and actuators that can rotate and/or translate the energy beam source to position the energy beam. In various embodiments, energy beam source 303 and/or deflector 305 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

The present disclosure presents various approaches to positioning at least one robotic arm in an assembly system. For example, an assembly system may include two robots, each of which may include a respective robotic arm. A first robotic arm may be configured to engage with a node during various operations performed with the node. For example, the first robotic arm may engage with a node that is to be connected with a part, and the part may be engaged by a second robotic arm. Various operations performed with the node (e.g., connecting the node with a part) may be performed with a relatively high degree of precision. Accordingly, at least one of the robotic arms may be positioned (e.g., repositioned) during an operation with the node in order to function in accordance with the precision commensurate with the operation.

In some aspects, the first robotic arm may engage with the node and the second robotic arm may engage with a part. An operation with the node may include connecting the node with the part. Thus, the first robotic arm may be positioned relative to the second robotic arm and/or the second robotic arm may be positioned relative to the first robotic arm. When the first and/or second robotic arms are configured to move, the first and/or second robotic arms may be positioned (e.g., repositioned) relative to the other one of the first and/or second robotic arms. Such positioning may correct the position(s) of the first and/or second robotic arms, e.g., to maintain the precision necessary for operations with a node, including connecting a node with a part by the first and second robotic arms.

The present disclosure provides various different embodiments of positioning one or more robotic arms of an assembly system for assembly processes and/or post-processing operations. It will be appreciated that various embodiments described herein may be practiced together. For example, an embodiment described with respect to one illustration of the present disclosure may be implemented in another embodiment described with respect to another illustration of the present disclosure.

Figure 4:
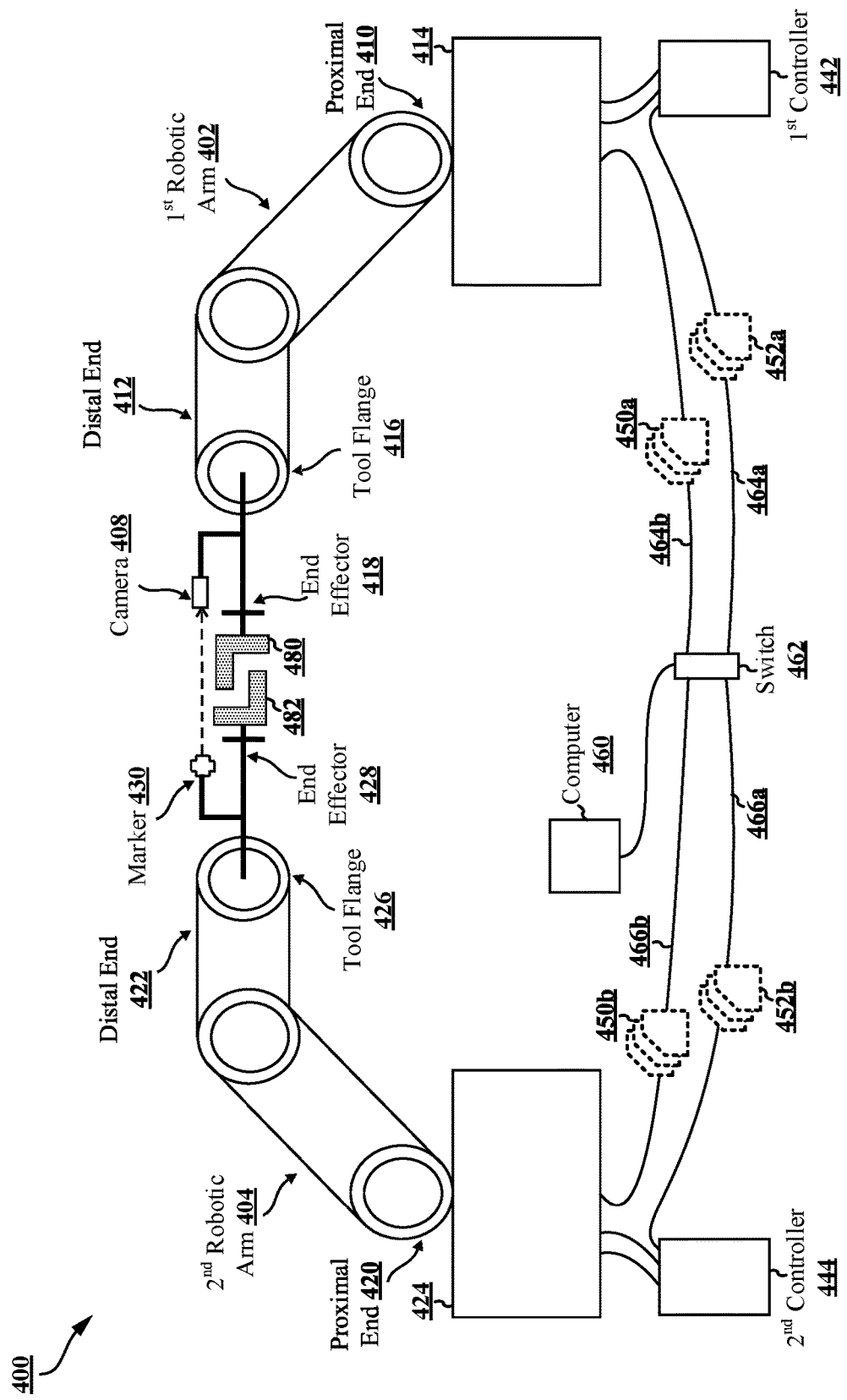
FIG. 4 illustrates a perspective of a first assembly system including a plurality of robotic arms.

FIG. 4 illustrates a perspective view of an assembly system 400. The assembly system 400 may be employed in various operations associated with assembly of a node-based transport structure. In one embodiment, the assembly system 400 may perform at least a portion of the assembly of the node-based transport structure without any fixtures. For example, the assembly system 400 may be implemented for connecting a node 480 with a part 482 (although other implementations are possible without departing from the scope of the present disclosure).

The assembly system 400 may include a first robotic arm 402. The first robotic arm 402 may have a distal end 412 and a proximal end 410. The distal end 412 may be configured for movement, e.g., for operations associated with a node and/or part. The proximal end 410 may be secure the first robotic arm 402, e.g., to a base 414.

The distal end 412 of the first robotic arm 402 may be connected with a tool flange 416. The tool flange 416 may be configured to connect with one or more components (e.g., tools) so that the first robotic arm 402 may connect with the one or more components and position the one or more components as the first robotic arm 402 moves.

In the illustrated embodiment, the distal end 412 of the first robotic arm 402 may be connected with an end effector 418, e.g., by means of the tool flange 416. That is, the end effector 418 may be connected with the tool flange 416, and the tool flange 416 may be connected with the distal end 412 of the first robotic arm 402. The end effector 418 may be a component configured to interface with various parts, nodes, and/or other structures. Illustratively, the end effector 418 may be configured to engage with a node 480 (however, the end effector 418 may be configured to engage with a part or other structure). Examples of an end effector 418 may include jaws, grippers, pins, or other similar components capable of engaging a node, part, or other structure.

The distal end 412 of the first robotic arm 402 may be further connected with a camera 408. In an aspect, the camera 408 may be connected with the end effector 418 and, therefore, the camera 408 may be connected with the distal end 412 of the first robotic arm 402 by means of the end effector 418 and the tool flange 416. The camera 408 may be configured to capture image data (e.g., still images, moving images, etc.). In one aspect, the camera 408 may be a motion-capture camera.

The field of view of the camera 408 may be away from the distal end 412 of the first robotic arm 402 and toward the second robotic arm 404. For example, the camera 408 may be positioned so that a distal end 422 of the second robotic arm 404 is at least partially within the field of view of the camera 408.

The assembly system 400 may further include a first controller 442. The first controller 442 may be communicatively coupled with the first robotic arm 402, e.g., via a wired connection, such as a bus, a wireless connection, or another connection interface. The first controller 442 may be configured to drive movement of the first robotic arm 402, which may include movement of the distal end 412 of the first robotic arm 402. Accordingly, the first controller 442 may drive movement of the tool flange 416, the end effector 418, and the camera 408 when driving movement of the distal end 412 of the first robotic arm 402. In some embodiments, the first controller 442 may further directly drive movement of one or of the tool flange 416, the end effector 418, and/or the camera 408 (e.g., the first controller 442 may cause the tool flange 416 and/or the end effector 418 to rotate and/or translate in space without driving movement of the distal end 412 of the first robotic arm 402).

The assembly system 400 may further include a computer 460. The computer 460 may be communicatively coupled with the first controller 442 via a first connection 464a (e.g., a wired connection, such as a bus, a wireless connection, or another connection interface). The computer 460 may be further communicatively coupled with the camera 408 disposed on the first robotic arm 402 via a second connection 464b (e.g., a wired connection, such as a bus, a wireless connection, or another connection interface). The computer 460 may be configured to generate a set of instructions 452a for the first robotic arm 402. The set of instructions 452a may instruct the first robotic arm 402 to move to a position. Accordingly, the computer 460 may provide the set of instructions 452a to the first controller 442 to drive movement of the first robotic arm 402 to the position indicated by the set of instructions 452a.

The computer 460 may generate a plurality of sets of instructions 452a to instruct the position of the first robotic arm 402. For example, the computer 460 may generate a first set of instructions to instruct a first position of the first robotic arm 402 when connecting the node 480 with the part 482. During the connecting the node 480 with the part 482, the computer 460 may generate a second set of instructions to instruct a second position of the first robotic arm 402. That is, the computer 460 may reposition (e.g., correct the position) of the first robotic arm 402 so that the node 480 is accurately connected with the part 482. As described herein, the computer 460 may generate one or more sets of instructions 452a based on image data 450a obtained from the camera 408.

As illustrated, the assembly system 400 may further include a second robotic arm 404. The second robotic arm 404 may have a distal end 422 and a proximal end 420. The proximal end 420 of the second robotic arm 404 may be connected with a base 424, e.g., in order to secure the second robotic arm 404. Illustratively, the first robotic arm 402 and the second robotic arm 404 may be located in the assembly system 400 to be approximately facing one another, e.g., so that the distal end 412 of the first robotic arm 402 extends towards the distal end 422 of the second robotic arm 404 and, correspondingly, the distal end 422 of the second robotic arm 404 extends towards the distal end 412 of the first robotic arm 402. However, the first and second robotic arms 402, 404 may be differently located in the assembly system 400 in other embodiments, e.g., according to an assembly operation that is to be performed.

Similar to the first robotic arm 402, the distal end 422 of the second robotic arm 404 may be connected with a tool flange 426, and the tool flange 426 may be connected with an end effector 428. The end effector 428 may be configured to engage with a node, part, or other structure, such as the part 482 that is to be connected with the node 480.

The distal end 422 of the second robotic arm 404 may be connected with at least one marker 430. In an aspect, the marker 430 may be connected with the end effector 428 and, therefore, the marker 430 may be connected with the distal end 422 of the second robotic arm 404 by means of the end effector 428 and the tool flange 426. While FIG. 4 illustrates one marker 430, other embodiments may include additional markers, which may be at least partially within the field of view of the camera 408 at one point during positioning and/or repositioning of the first robotic arm 402.

The marker 430 may be at least partially within the field of view of the camera 408.

Accordingly, the camera 408 may be configured to capture image data 450a of the marker 430. In various embodiments, the marker 430 may be of any suitable material and/or shape to be distinguishable in the image data 450a. For example, the marker 430 may be composed of a reflective material, the marker 430 may be a specific shape (e.g., an "X", a cross, etc.), or of another material and/or shape that is detectable in the image data 450a. The marker 430 may be an active marker (e.g., the marker 430 may be configured to change color, change luminous intensity, etc.) or a passive marker.

In one embodiment, the second robotic arm 404 may be stationary. In another embodiment, the second robotic arm 404 may be configured for movement, e.g., so that a distal end 422 of the second robotic arm 404 moves and, correspondingly, causes movement of the tool flange 426, the end effector 428, and the marker 430. When the second robotic arm 404 is configured for movement, the second robotic arm 404 may be communicatively coupled with a second controller 444. The second controller 444 may be configured to drive movement of the second robotic arm 404. Similar to the movement of the first robotic arm 402, the movement of the second robotic arm 404 may be based on a set of instructions 452b generated by the computer 460. The computer may generate the set of instructions based on image data 450b, which may be captured by a camera disposed on the second robotic arm 404 and the image data 450b may be of at least one other marker (e.g., a fixed marker located in the assembly system 400, a marker connected with the distal end 412 of the first robotic arm 402, etc.).

The computer 460 may be communicatively coupled with the second controller 444 via a third connection 466a, and may issue a generated set of instructions 452b to instruct the position of the second robotic arm 404 to the second controller 444 so that the second controller 444 may drive movement of the second robotic arm 404 according to the set of instructions 452b.

When the computer 460 is communicatively coupled with both the first controller 442 and the second controller 444, the computer 460 may be connected with a switch 462. The switch 462 may control the path of the sets of instructions 452a-b. For example, when the computer 460 generates a set of instructions 452a to instruct the position of the first robotic arm 402, the switch 462 may cause the set of instructions 452a to be sent over the first connection 464a to the first controller 442.

During an assembly operation of a node-based transport structure, the first robotic arm 402 may engage with the node 480 through the end effector 418 and the second robotic arm 404 may engage with the part 482 through the end effector 428. In various embodiments of the assembly operation of a node-based transport structure, the node 480 may be connected with the part 482 and, therefore, the first and second robotic arms 402, 404 may perform the assembly operation. Connection of the node 480 with the part 482 is exemplary, and the operations described herein are applicable to other assembly and/or post-processing operations without departing from the scope of the present disclosure.

According to one embodiment, the first robotic arm 402 may be configured to move to bring the node 480 to the part 482 connected with the second robotic arm 404. Thus, the distal end 412 of the first robotic arm 402 may extend away from the base 414 and toward the distal end 422 of the second robotic arm 404, at which the part 482 is engaged. In one embodiment, the movement of the distal end 412 of the first robotic arm 402 may be at least approximately horizontal (e.g., parallel to the horizon); however, the movement of the distal end 412 of the first robotic arm 402 may be additionally or alternatively approximately vertical (e.g., perpendicular to the horizon).

The movement of the distal end 412 of the first robotic arm 402 toward the distal end 422 of the second robotic arm 404 may be caused by the first controller 442. The first controller 442 may cause the movement of the distal end 412 of the first robotic arm 402 based on the set of instructions 452a provided by the computer 460.

When the node 480 is connected with the first robotic arm 402 (e.g., engaged with the end effector 418), the distal end 412 of the first robotic arm 402 may be positioned to accurately connect the node 480 with the part 482. To that end, the camera 408 may capture image data 450a of the marker 430. The camera 408 may provide the image data 450a to the computer 460. For example, the computer 460 may issue a request to the camera 408 to capture the image data 450a or the camera 408 may automatically capture the image data 450a (e.g., when the first robotic arm 402 is at a fixed position and not moving, when the marker 430 is within the field of view of the camera 408, when the marker 430 is activated, etc.).

Based on the image data 450a, the computer 460 may generate at least one set of instructions 452a. In some embodiments, the assembly system 400 may include other markers in addition to the marker 430, such as another marker located on the second robotic arm 404 and/or a marker located elsewhere in the assembly system 400 and/or proximate thereto and within the field of view of the camera 408 (e.g., located on a wall or ceiling of a room in which the assembly system 400 is located).

The computer 460 may determine the location of the marker 430 in the image data 450a, such as a set of numerical values indicating the location of the marker 430 and/or a set of coordinates indicating the location of the marker 430. In one embodiment, the computer 460 may determine the actual location (e.g., absolute location) of the marker 430 in space (e.g., three-dimensional space), as shown by the image data 450a. In another embodiment, the computer 460 may determine the relative location of the marker 430 in the image data 450a, e.g., with respect to the first robotic arm 402.

The computer 460 may have stored therein or may be otherwise able to access computer-aided design (CAD) data (e.g., numerical CAD data and/or a set of coordinates based on CAD data). The CAD data may indicate the position for first robotic arm 402 in order to accurately connect the node 480 with the part 482 (e.g., the "correct" position of the distal end 412 of the first robotic arm 402 in order for the node 480 to be accurately connected with the part 482).

The computer 460 may determine the location of the marker 430 in the image data 450a relative to the CAD data. For example, the computer 460 may compare the determined location of the marker 430 to the CAD data, and the computer 460 may determine (e.g., calculate) the difference between the determined location of the marker 430 and the CAD data. The determined difference may indicate the variance between the actual position of the first robotic arm 402 in the assembly system 400 and the "correct" position of the first robotic arm 402 in the assembly system 400, wherein the "correct" position of the first robotic arm 402 in the assembly system 400 may be the position of the first robotic arm 402 in order to reduce (or eliminate) the variance and accurately connect the node 480 with the part 482. The determined difference may be used for positional compensation(s) and/or positional correction(s) of the first robotic arm 402, the tool flange 416, and/or the end effector 418, thereby compensating and/or correcting the position of the node 480 to be accurate (e.g., within one or more thresholds commensurate with tolerances of the assembly system 400).

Based on the determined location of the marker 430 in the image data 450a and the CAD data (e.g., based on the determined difference between the determined location of the marker 430 to the CAD data), the computer 460 may determine a set of instructions 452a that indicates a position to which the distal end 412 of the first robotic arm 402 is to move in order to accurately connect the node 480 with the part 482. For example, the set of instructions 452a may indicate one or more movements that are to be performed by the first robotic arm 402 so that the distal end 412 of the first robotic arm 402 will be positioned for an accurate connection of the node 480 with the part 482. In one embodiment, the set of instructions 452a may indicate one or more movements of the distal end 412 of the first robotic arm 402 so that the distal end 412 of the first robotic arm 402 will be at a position corresponding to the CAD data.

The computer 460 may generate the set of instructions 452a to indicate one or more movements in one or more of six degrees of freedom (6DoF), including forward/backward (e.g., surge), up/down (e.g., heave), left/right (e.g., sway) for translation in space and including yaw, pitch, and roll for rotation in space. For one or more of the 6DoF, the tool flange 416 and/or the end effector 418 may perform one or more movements. For example, the computer 460 may generate the set of instructions 452a to cause the tool flange 416 and/or the end effector 418 to rotate and/or translate in space.

The computer 460 may provide the generated set of instructions 452a to the first controller 442. Accordingly, the first controller 442 may drive movement of the first robotic arm 402 based on the set of instructions 452a. For example, the first controller 442 may drive movement of the first robotic arm 402, thereby causing the distal end 412 of the first robotic arm 402 to move into a position indicated by the set of instructions 452a. Thus, the first robotic arm 402 may be positioned relative to the marker 430. Correspondingly, the first robotic arm 402 may move the tool flange 416, the end effector 418, and the node 480 into a position corresponding to the set of instructions 452a.

Based on the set of instructions 452a, the first robotic arm 402 may cause the node 480 to contact the part 482 that is engaged with the end effector 428 connected with the second robotic arm 404. When the node 480 is accurately contacting the part 482 (e.g., within designed or acceptable tolerances), the node 480 may be connected with the part 482 in order to form a portion of a node-based transport structure (e.g., without any fixtures). For example, the first robotic arm 402 and/or the end effector 418 may cause the node 480 to be extended toward the part 482 and, when the node 480 is contacting the part 482, pressure may be applied until at least one feature (e.g., a male/extension feature, a female/reception feature, etc.) of the node 480 is securely engaged with at least one feature (e.g., a correspondingly opposing one of a female/reception feature, a male/extension feature, etc.) of the part 482.

As aforementioned, the computer 460 may generate a plurality of sets of instructions.

Each set of instructions may be dynamically generated in association with the movement of the first robotic arm 402. For example, the computer 460 may generate one set of instructions 452a that causes the first controller 442 to drive movement of the first robotic arm 402 into a first position. The camera 408 may capture image data 450a of the marker 430 during and/or after the first robotic arm 402 is controlled to the first position. The image data 450*a* may be provided to the computer 460, and the computer 460 may reevaluate the location of the marker 430. The computer 460 may compare the reevaluated location of the marker 430 to the CAD data, and generate a next set of instructions to compensate and/or correct for the position of the first robotic arm 402. The computer 460 may provide the next set of instructions to the first controller 442 to drive movement of the first robotic arm 402 to a second position corresponding to the next set of instructions. The computer 460 may iteratively generate instructions based on image data until the first robotic arm 402 is at a position at which the node 480 may be accurately connected with the part 482. The computer 460 may generate sets of instructions while the first robotic arm 402 is in motion and/or when the first robotic arm 402 is stationary between movements performed according to sets of instructions.

The arrangement of FIG. 4 illustrates some potential embodiments of an assembly system 400. However, other potential embodiments of the assembly system 400 may be configured without departing from the scope of the present disclosure. In another embodiment of the assembly system 400, a camera (e.g., the camera 408) may be differently positioned. For example, the camera (e.g., the camera 408) may be centralized camera, and therefore may not be positioned on either a first robotic arm (e.g., the first robotic arm 402) or a second robotic arm (e.g., the second robotic arm 404). Instead, the camera (e.g., the camera 408) may be disposed at a location in which the field of view of the camera captures at least a portion of the a first robotic arm (e.g., the first robotic arm 402) or a second robotic arm (e.g., the second robotic arm 404)—e.g., the camera may be positioned on a wall or ceiling within or proximate to the assembly system 400. In such an embodiment, the camera (e.g., the camera 408) may capture image data (e.g., image data 450*a*) of a marker that is disposed on the first robotic arm (e.g., the first robotic arm 402) and/or a marker (e.g., the marker 430) that is disposed on the second robotic mar (e.g., the second robotic arm 404). In further embodiments, one or more additional robotic arms may be included in the assembly systems, and one or more of the additional robotic arms may have markers (e.g., similar to the marker 430) disposed thereon, which the camera (e.g., the camera 408) may be configured to capture in image data (e.g., image data 450*a*).

In some embodiments in which the camera (e.g., the camera 408) is not disposed on a robotic arm, a computer (e.g., the computer 460) may generate a set of instructions (e.g., the set of instructions 452*a*) that instructs movement of one or more robotic arms, e.g., in order to correct the position of the one or more robotic arms. In some embodiments, the computer may generate such a set of instructions based on relative positions of the one or more robotic arms, such as the positions of the robotic arms relative to one another. For example, the computer may generate a set of instructions that causes movement of the first robotic arm relative to the second and/or other additional robotic arms, e.g., based on respective markers affixed to each of the first, second, and (potentially) one or more additional robotic arms.

In another embodiment, the camera 408 may be replaced or used in combination with a different metrology system, such as a laser tracking system or other device configured to capture metrology data of the assembly system 400.

Figure 5:
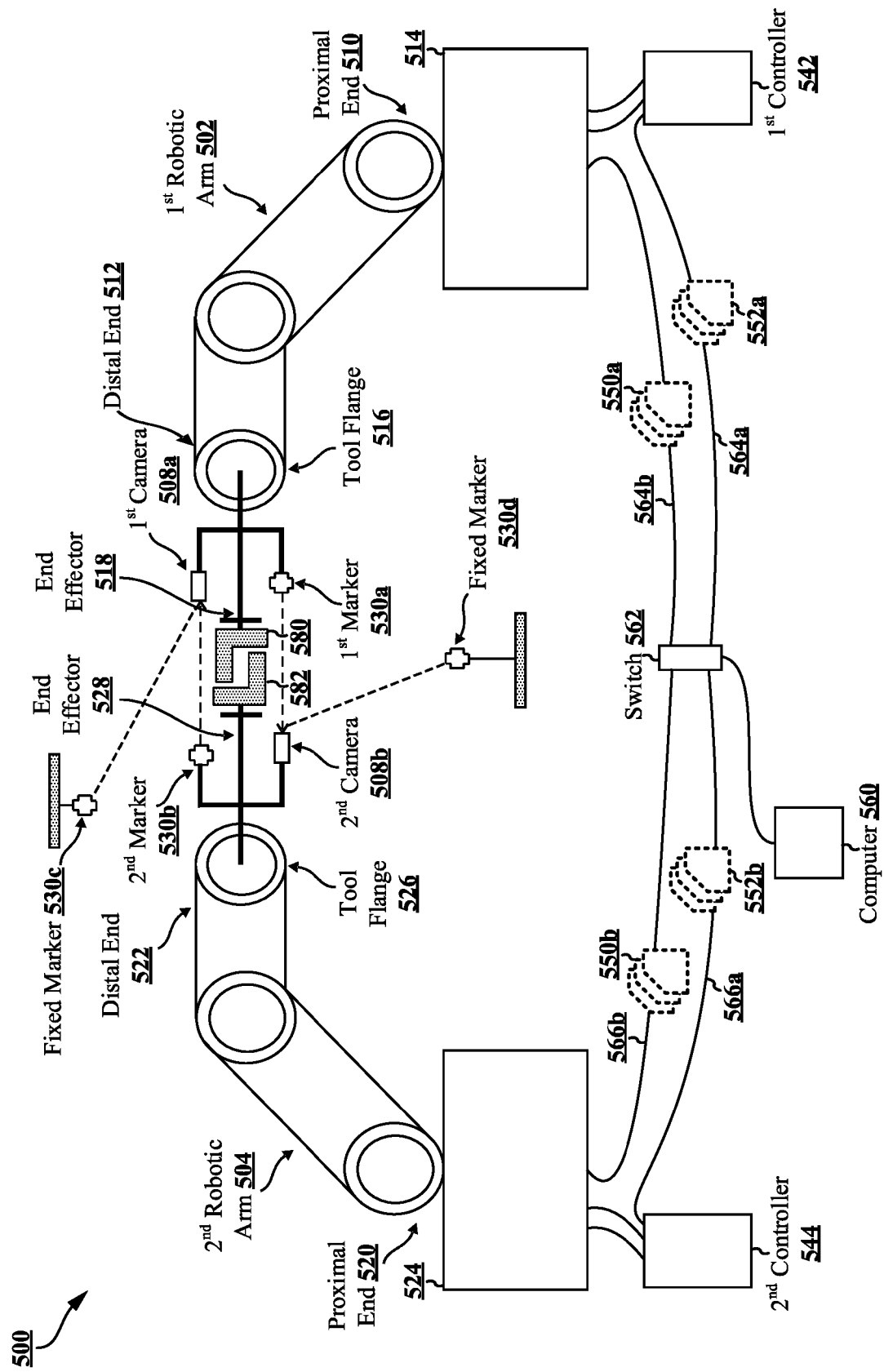
FIG. 5 illustrates a perspective of a second assembly system including a plurality of robotic arms.

FIG. 5 illustrates a perspective view of an assembly system 500. The assembly system 500 may be employed in various operations associated with assembly of a node-based transport structure. In one embodiment, the assembly system 500 may perform at least a portion of the assembly of the node-based transport structure without any fixtures. For example, the assembly system 500 may be implemented for connecting a node 580 with a part 582 (although other implementations are possible without departing from the scope of the present disclosure).

The assembly system 500 may include a first robotic arm 502. The first robotic arm 502 may have a distal end 512 and a proximal end 510. The distal end 512 may be configured for movement, e.g., for operations associated with a node and/or part. The proximal end 510 may be secure the first robotic arm 502, e.g., to a base 514.

The distal end 512 of the first robotic arm 502 may be connected with a tool flange 516. The tool flange 516 may be configured to connect with one or more components (e.g., tools) so that the first robotic arm 502 may connect with the one or more components and position the one or more components as the first robotic arm 502 moves.

In the illustrated embodiment, the distal end 512 of the first robotic arm 502 may be connected with an end effector 518, e.g., by means of the tool flange 516. That is, the end effector 518 may be connected with the tool flange 516, and the tool flange 516 may be connected with the distal end 512 of the first robotic arm 502. The end effector 518 may be a component configured to interface with various parts, nodes, and/or other structures. Illustratively, the end effector 518 may be configured to engage with a node 580 (however, the end effector 518 may be configured to engage with a part or other structure). Examples of an end effector 518 may include jaws, grippers, pins, or other similar components capable of engaging a node, part, or other structure.

The distal end 512 of the first robotic arm 502 may be further connected with a first camera 508*a*. In an aspect, the first camera 508*a* may be connected with the end effector 518 and, therefore, the first camera 508*a* may be connected with the distal end 512 of the first robotic arm 502 by means of the end effector 518 and the tool flange 516. The first camera 508*a* may be configured to capture image data (e.g., still images, moving images, etc.). In one aspect, the first camera 508*a* may be a motion-capture camera.

The field of view of the first camera 508*a* may be away from the distal end 512 of the first robotic arm 502 and toward the second robotic arm 504. For example, the first camera 508*a* may be positioned so that a distal end 522 of the second robotic arm 504 is at least partially within the field of view of the first camera 508*a*.

The distal end 512 of the first robotic arm 502 may be connected with at least one a first marker 530*a*. In an aspect, the first marker 530*a* may be connected with the end effector 518 and, therefore, the first marker 530*a* may be connected with the distal end 512 of the first robotic arm 502 by means of the end effector 518 and the tool flange 516. While FIG. 5 illustrates one first marker 530*a*, other embodiments may include additional markers, which may be at least partially within the field of view of the first camera 508*a* at one point during positioning and/or repositioning of the first robotic arm 502.

The first marker 530*a* may be at least partially within the field of view of a second camera 508*b*, which may be connected with a distal end 522 of a second robotic arm 504 as further described herein (e.g., infra). In various embodiments, the first marker 530*a* may be of any suitable material and/or shape to be distinguishable in second image data 550*b* captured by the second camera 508*b*. For example, the first marker 530*a* may be composed of a reflective material, the first marker 530*a* may be a specific shape (e.g., an "X", a cross, etc.), or of another material and/or shape that is detectable in the second image data 550b. The first marker 530a may be an active marker (e.g., the first marker 530a may be configured to change color, change luminous intensity, etc.) or a passive marker.

The assembly system 500 may further include a first controller 542. The first controller 542 may be communicatively coupled with the first robotic arm 502, e.g., via a wired connection, such as a bus, a wireless connection, or another connection interface. The first controller 542 may be configured to drive movement of the first robotic arm 502, which may include movement of the distal end 512 of the first robotic arm 502. Accordingly, the first controller 542 may drive movement of the tool flange 516, the end effector 518, and the first camera 508a when driving movement of the distal end 512 of the first robotic arm 502. In some embodiments, the first controller 542 may further directly drive movement of one or of the tool flange 516, the end effector 518, and/or the first camera 508a (e.g., the first controller 542 may cause the tool flange 516 and/or the end effector 518 to rotate and/or translate in space without driving movement of the distal end 512 of the first robotic arm 502).

As illustrated, the assembly system 500 may further include a second robotic arm 504.

The second robotic arm 504 may have a distal end 522 and a proximal end 520. The proximal end 520 of the second robotic arm 504 may be connected with a base 524, e.g., in order to secure the second robotic arm 504. The first robotic arm 502 and the second robotic arm 504 may be located in the assembly system 500 to be approximately facing one another, e.g., so that the distal end 512 of the first robotic arm 502 extends towards the distal end 522 of the second robotic arm 504 and, correspondingly, the distal end 522 of the second robotic arm 504 extends towards the distal end 512 of the first robotic arm 502. However, the first and second robotic arms 502, 504 may be differently located in the assembly system 500 in other embodiments, e.g., according to an assembly operation that is to be performed.

Similar to the first robotic arm 502, the distal end 522 of the second robotic arm 504 may be connected with a tool flange 526, and the tool flange 526 may be connected with an end effector 528. The end effector 528 may be configured to engage with a node, part, or other structure, such as the part 582 that is to be connected with the node 580.

The distal end 522 of the second robotic arm 504 may be connected with at least one a second marker 530b. In an aspect, the second marker 530b may be connected with the end effector 528 and, therefore, the second marker 530b may be connected with the distal end 522 of the second robotic arm 504 by means of the end effector 528 and the tool flange 526. While FIG. 5 illustrates one second marker 530b, other embodiments may include additional markers, which may be at least partially within the field of view of the first camera 508a at one point during positioning and/or repositioning of the first robotic arm 502.

The second marker 530b may be at least partially within the field of view of the first camera 508a. Accordingly, the first camera 508a may be configured to capture first image data 550a of the second marker 530b. In various embodiments, the second marker 530b may be of any suitable material and/or shape to be distinguishable in the first image data 550a. For example, the second marker 530b may be composed of a reflective material, the second marker 530b may be a specific shape (e.g., an "X", a cross, etc.), or of another material and/or shape that is detectable in the first image data 550a. The second marker 530b may be an active marker (e.g., the second marker 530b may be configured to change color, change luminous intensity, etc.) or a passive marker.

The second robotic arm 504 may be configured for movement, e.g., so that a distal end 522 of the second robotic arm 504 moves and, correspondingly, causes movement of the tool flange 526, the end effector 528, and the second marker 530b. When the second robotic arm 504 is configured for movement, the second robotic arm 504 may be communicatively coupled with a second controller 544. The second controller 544 may be configured to drive movement of the second robotic arm 504. Similar to the movement of the first robotic arm 502, the movement of the second robotic arm 504 may be based on a set of instructions 552b generated by the computer 560. The computer 560 may be communicatively coupled with the second controller 544 via a third connection 566a, and may issue a generated set of instructions 552b to instruct the position of the second robotic arm 504 to the second controller 544 so that the second controller 544 may drive movement of the second robotic arm 504 according to the set of instructions 552b.

The distal end 522 of the second robotic arm 504 may be further connected with a second camera 508b. In an aspect, the second camera 508b may be connected with the end effector 528 and, therefore, the second camera 508b may be connected with the distal end 522 of the second robotic arm 504 by means of the end effector 528 and the tool flange 526. The second camera 508b may be configured to capture second image data 550b (e.g., still images, moving images, etc.). In one aspect, the second camera 508b may be a motion-capture camera.

The field of view of the second camera 508b may be away from the distal end 522 of the second robotic arm 504 and toward the first robotic arm 502. For example, the second camera 508b may be positioned so that a distal end 512 of the first robotic arm 502 is at least partially within the field of view of the second camera 508b.

In some embodiments, the assembly system 500 may further include one or more fixed markers 530c-d. The one or more fixed markers 530c-d may be unconnected with the robotic arms 502, 504. Instead, the fixed markers 530c-d may be located in a location of the assembly system 500. For example, a first fixed marker 530c may be located on a ceiling or other overhead surface that is above the robotic arms 502, 504 in the assembly system 500. In other examples, a second fixed marker 530d may be located on another surface that is proximate to the robotic arms 502, 504, such as a surface to the side of the robotic arms 502, 504 (e.g., a wall), a surface below the robotic arms 502, 504 (e.g., a floor), or another surface (e.g., a surface elevated from the floor but below the distal ends 512, 522 of the robotic arms 502, 504.

The fixed markers 530c-d may serve as respective reference points. Because the fixed markers 530c-d may be stationary in the assembly system 500, the fixed markers 530c-d may be absolute positions. Accordingly, the frames of reference for each of the robotic arms 502, 504 may be provided by the fixed markers 530c-d. In some embodiments, one or more fixed markers (e.g., the fixed markers 530c-d) may provide a common frame of reference with respect to all robotic arms in an assembly system (e.g., the first and second robotic arms 502, 504 in the assembly system 500). Thus, two or more robotic arms (e.g., three, four, or potentially even more robotic arms) may be contemporaneously configured for movement in an assembly system, for example, so that a plurality of operations may be contemporaneously (potentially simultaneously) performed in a coordinated approach with a common frame of reference. This enables robots to determine their positions with respect to each other in embodiments where a plurality of robots are configured for movement during an assembly/post-processing operation.

The fixed markers 530c-d may be at least partially within the fields of view of the first camera 508a and/or the second camera 508b. For example, the first camera 508a may be configured to capture first image data 550a of the first fixed marker 530c (e.g., first image data 550a that also captures the second marker 530b). Similarly, the second camera 508b may be configured to capture second image data 550b of the second fixed marker 530d (e.g., the second image data 550b in which the first marker 530a is also captured). In some embodiments, at least one of the fixed markers 530c-d may be within the fields of view of both cameras 508a-b (at least at some point during an assembly operation).

In various embodiments, the fixed markers 530c-d may be of any suitable material and/or shape to be distinguishable in the image data 550a-b. For example, one or both of the fixed markers 530c-d may be composed of a reflective material, one or both of the fixed markers 530c-d may be a specific shape (e.g., an "X", a cross, etc.), or of another material and/or shape that is detectable in the image data 550a-b. One or both of the fixed markers 530c-d may be an active marker (e.g., one or both of the fixed markers 530c-d may be configured to change color, change luminous intensity, etc.) or a passive marker.

The assembly system 500 may further include a computer 560. The computer 560 may be communicatively coupled with the first controller 542 via a first connection 564a (e.g., a wired connection, such as a bus, a wireless connection, or another connection interface). The computer 560 may be further communicatively coupled with the first camera 508a disposed on the first robotic arm 502 via a second connection 564b (e.g., a wired connection, such as a bus, a wireless connection, or another connection interface). The computer 560 may be configured to generate a first set of instructions 552a for the first robotic arm 502. The first set of instructions 552a may instruct the first robotic arm 502 to move to a position. Accordingly, the computer 560 may provide the first set of instructions 552a to the first controller 542 to drive movement of the first robotic arm 502 to the position indicated by the first set of instructions 552a.

The computer 560 may generate a plurality of sets of instructions 552a-b to instruct the positions of the first robotic arm 502 and the second robotic arm 504. For example, the computer 560 may generate a first set of instructions to instruct a first position of the first robotic arm 502 when connecting the node 580 with the part 582. During the connecting the node 580 with the part 582, the computer 560 may generate an updated first set of instructions to instruct a second position of the first robotic arm 502. That is, the computer 560 may reposition (e.g., correct the position) of the first robotic arm 502 so that the node 580 is accurately connected with the part 582. As described herein, the computer 560 may generate one or more first sets of instructions 552a based on first image data 550a obtained from the first camera 508a.

Similarly, the computer 560 may be communicatively coupled with the second controller 544 via the third connection 566a (e.g., a wired connection, such as a bus, a wireless connection, or another connection interface). The computer 560 may be further communicatively coupled with the second camera 508b disposed on the second robotic arm 504 via a fourth connection 566b (e.g., a wired connection, such as a bus, a wireless connection, or another connection interface). The computer 560 may be configured to generate a second set of instructions 552b for the second robotic arm 504. The second set of instructions 552b may instruct the second robotic arm 504 to move to a position. Accordingly, the computer 560 may provide the second set of instructions 552b to the second controller 544 to drive movement of the second robotic arm 504 to the position indicated by the second set of instructions 552b.

The computer 560 may generate a second set of instructions 552b to instruct a first position of the second robotic arm 504 when connecting the part 582 with the node 580. During the connecting the part 582 with the node 580, the computer 560 may generate an updated second set of instructions to instruct a second position of the second robotic arm 504. That is, the computer 560 may reposition (e.g., correct the position) of the second robotic arm 504 so that the part 582 is accurately connected with the node 580. As described herein, the computer 560 may generate one or more second sets of instructions 552b based on second image data 550b obtained from the second camera 508b.

When the computer 560 is communicatively coupled with both the first controller 542 and the second controller 544, the computer 560 may be connected with a switch 562. The switch 562 may control the path of the sets of instructions 552a-b. For example, when the computer 560 generates a first set of instructions 552a to instruct the position of the first robotic arm 502, the switch 562 may cause the first set of instructions 552a to be sent over the first connection 564a to the first controller 542. Similarly, when the computer 560 generates a second set of instructions 552b to instruct the position of the second robotic arm 504, the switch 562 may cause the second set of instructions 552b to be sent over the second connection 564b to the first controller 542. In some embodiments, the computer 560 may control the switch 562. For example, the computer 560 may indicate, to the switch 562, which of the connections 564a, 566a to use when sending the sets of instructions 552a-b, or the computer 560 may indicate, to the switch 562, which of the controllers 542, 544 one of the sets of instructions 552a-b is to be sent.

During an assembly operation of a node-based transport structure, the first robotic arm 502 may engage with the node 580 through the end effector 518 and the second robotic arm 504 may engage with the part 582 through the end effector 528. In various embodiments of the assembly operation of a node-based transport structure, the node 580 may be connected with the part 582 and, therefore, the first and second robotic arms 502, 504 may perform the assembly operation. Connection of the node 580 with the part 582 is exemplary, and the operations described herein are applicable to other assembly and/or post-processing operations without departing from the scope of the present disclosure.

According to one embodiment, the first robotic arm 502 may be configured to move to bring the node 580 to the part 582 connected with the second robotic arm 504. Thus, the distal end 512 of the first robotic arm 502 may extend away from the base 514 and toward the distal end 522 of the second robotic arm 504, at which the part 582 is engaged. In one embodiment, the movement of the distal end 512 of the first robotic arm 502 may be at least approximately horizontal (e.g., parallel to the horizon); however, the movement of the distal end 512 of the first robotic arm 502 may be additionally or alternatively approximately vertical (e.g., perpendicular to the horizon).

The movement of the distal end 512 of the first robotic arm 502 toward the distal end 522 of the second robotic arm 504 may be caused by the first controller 542. The first controller 542 may cause the movement of the distal end 512 of the first robotic arm 502 based on the first set of instructions 552a provided by the computer 560.

When the node 580 is connected with the first robotic arm 502 (e.g., engaged with the end effector 518), the distal end 512 of the first robotic arm 502 may be positioned to accurately connect the node 580 with the part 582. To that end, the first camera 508a may capture first image data 550a of the second marker 530b and/or the first fixed marker 530c. In some embodiments, the first camera 508a may capture first image data 550a of the second fixed marker 530d, e.g., in addition or alternative to the first fixed marker 530c. Operations described herein with respect to the first fixed marker 530c captured in the first image data 550a may be similar when the second fixed marker 530d is captured in the first image data 550a (e.g., comparison to CAD data associated with the first robotic arm 502, etc.).

The first camera 508a may provide the first image data 550a to the computer 560. For example, the computer 560 may issue a request to the first camera 508a to capture the first image data 550a or the first camera 508a may automatically capture the first image data 550a (e.g., when the first robotic arm 502 is at a fixed position and not moving, when the second marker 530b and/or the first fixed marker 530c is/are within the field of view of the first camera 508a, when the second marker 530b and/or first fixed marker 530c is/are activated, etc.).

Based on the first image data 550a, the computer 560 may generate at least one set of instructions 552a. The computer 560 may determine the location of the second marker 530b, such as a set of numerical values indicating the location of the second marker 530b and/or a set of coordinates indicating the location of the second marker 530b in the first image data 550a. In one embodiment, the computer 560 may determine the actual location (e.g., absolute location) of the second marker 530b in space (e.g., three-dimensional space) in the first image data 550a. In another embodiment, the computer 560 may determine the relative location of the second marker 530b in the first image data 550a, e.g., with respect to the first robotic arm 502.

From the first image data 550a, the computer 560 may determine the location of the first fixed marker 530c, such as a set of numerical values indicating the location of the first fixed marker 530c and/or a set of coordinates indicating the location of the first fixed marker 530c. In one embodiment, the computer 560 may determine the actual location (e.g., absolute location) of the first fixed marker 530c in space (e.g., three-dimensional space) in the first image data 550a. In another embodiment, the computer 560 may determine the relative location of the first robotic arm 502 relative to the first fixed marker 530c in the first image data 550a.

The computer 560 may have stored therein or may be otherwise able to access a set of CAD data associated with the first robotic arm 502 (e.g., numerical CAD data and/or a set of coordinates based on CAD data). The set of CAD data associated with the first robotic arm 502 may indicate the position for first robotic arm 502 in order to accurately connect the node 580 with the part 582 (e.g., the "correct" position of the distal end 512 of the first robotic arm 502 in order for the node 580 to be accurately connected with the part 582).

In one embodiment, the computer 560 may determine the location of the second marker 530b in the first image data 550a relative to first CAD data associated with the first robotic arm 502 of the set of CAD data associated with the first robotic arm 502. For example, the computer 560 may compare the determined location of the second marker 530b in the first image data 550a to the first CAD data associated with the first robotic arm 502, and the computer 560 may determine (e.g., calculate) the difference between the determined location of the second marker 530b and the first CAD data associated with the first robotic arm 502. The determined difference may indicate the variance between the actual position of the first robotic arm 502 in the assembly system 500 and the "correct" position of the first robotic arm 502 in the assembly system, wherein the "correct" position of the first robotic arm 502 in the assembly system may be the position of the first robotic arm 502 in order to reduce (or eliminate) the variance and accurately connect the node 580 with the part 582. The determined difference may be used for positional compensation(s) and/or positional correction(s) of the first robotic arm 502, the tool flange 516, and/or the end effector 518, thereby compensating and/or correcting the position of the node 580 to be accurate (e.g., within one or more thresholds commensurate with designed or acceptable tolerances).

In one embodiment, the computer 560 may determine the location of the first fixed marker 530c in the first image data 550a relative to second CAD data associated with the first robotic arm 502 of the set of CAD data associated with the first robotic arm 502. For example, the computer 560 may compare the determined location of the first fixed marker 530c to the second CAD data associated with the first robotic arm 502, and the computer 560 may determine (e.g., calculate) the difference between the determined location of the first fixed marker 530c to the second CAD data associated with the first robotic arm 502. The determined difference may indicate the variance between the actual position of the first robotic arm 502 in the assembly system 500 and the "correct" position of the first robotic arm 502 in the assembly system, wherein the "correct" position of the first robotic arm 502 in the assembly system may be the position of the first robotic arm 502 in order to reduce (or eliminate) the variance and accurately connect the node 580 with the part 582. The determined difference may be used for positional compensation(s) and/or positional correction(s) of the first robotic arm 502, the tool flange 516, and/or the end effector 518, thereby compensating and/or correcting the position of the node 580 to be accurate (e.g., within one or more thresholds commensurate with designed or acceptable tolerances).

According to one embodiment, the determined location of the first fixed marker 530c may function as a reference point in order to provide a frame of reference and/or position of the first robotic arm 502 relative to a fixed and known point (i.e., the first fixed marker 530c). That is, the location of the first fixed marker 530c in the assembly system 500 may be known (e.g., stored in or otherwise accessible by the computer 560) and, therefore, the computer 560 may use the first fixed marker 530c in order to determine a position of the first robotic arm 502 in the assembly system 500. For example, the computer 560 may determine (e.g., calculate) the location of the first fixed marker 530c in the first image data 550a, and the computer 560 may derive the position of the first robotic arm 502 in the assembly system 500 based on the location of the first fixed marker 530c in the first image data 550a (e.g., the computer 560 may calculate the distance and/or direction of the first fixed marker 530c in the first image data 550a in order to derive the position of the first robotic arm 502).

Based on the determined location of the second marker 530b, the determined location of the first fixed marker 530c, the first CAD data associated with the first robotic arm 502, and/or the second CAD data associated with the first robotic arm 502, the computer 560 may determine a first set of instructions 552a that indicates a position to which the distal end 512 of the first robotic arm 502 is to move in order to accurately connect the node 580 with the part 582. For example, the first set of instructions 552a may indicate one or more movements that are to be performed by the first robotic arm 502 so that the distal end 512 of the first robotic arm 502 will be positioned for an accurate connection of the node 580 with the part 582. In one embodiment, the first set of instructions 552a may indicate one or more movements of the distal end 512 of the first robotic arm 502 so that the distal end 512 of the first robotic arm 502 will be at a position at which the variance from the first CAD data and/or the second CAD data associated with the first robotic arm 502 may be satisfactorily low (e.g., within one or more thresholds of variance that is acceptable for an accurate connection of the node 580 with the part 582).

The computer 560 may generate the first set of instructions 552a to indicate one or more movements in one or more of 6DoF, including forward/backward (e.g., surge), up/down (e.g., heave), left/right (e.g., sway) for translation in space and including yaw, pitch, and roll for rotation in space. For one or more of the 6DoF, the tool flange 516 and/or the end effector 518 may perform one or more movements. For example, the computer 560 may generate the first set of instructions 552a to cause the tool flange 516 and/or the end effector 518 to rotate and/or translate in space.

The computer 560 may provide the generated first set of instructions 552a to the first controller 542. For example, the computer 560 may indicate, to the switch 562, that the first set of instructions 552a is to be provided to the first controller 542, and the switch 562 may cause the first set of instructions 552a to be sent over the first connection 564a to the first controller 542.

Accordingly the first controller 542 may drive movement of the first robotic arm 502 based on the first set of instructions 552a. For example, the first controller 542 may drive movement of the first robotic arm 502, thereby causing the distal end 512 of the first robotic arm 502 to move into a position indicated by the first set of instructions 552a. Thus, the first robotic arm 502 may be positioned relative to the second marker 530b and/or the first fixed marker 530c. Correspondingly, the first robotic arm 502 may move the tool flange 516, the end effector 518, and the node 580 into a position corresponding to the first set of instructions 552a.

Based on the first set of instructions 552a, the first robotic arm 502 may cause the node 580 to contact the part 582 that is engaged with the end effector 528 connected with the second robotic arm 504. When the node 580 is accurately contacting the part 582 (e.g., within designed or acceptable tolerances), the node 580 may be connected with the part 582 in order to form a portion of a node-based transport structure (e.g., without any fixtures). For example, the first robotic arm 502 and/or the end effector 518 may cause the node 580 to be extended toward the part 582 and, when the node 580 is contacting the part 582, pressure may be applied until at least one feature (e.g., a male/extension feature, a female/reception feature, etc.) of the node 580 is securely engaged with at least one feature (e.g., a correspondingly opposing one of a female/reception feature, a male/extension feature, etc.) of the part 582.

As aforementioned, the computer 560 may generate a plurality of first sets of instructions. Each first set of instructions may be dynamically generated in association with the movement of the first robotic arm 502. For example, the computer 560 may generate one first set of instructions 552a that causes the first controller 542 to drive movement of the first robotic arm 502 into a first position. The first camera 508a may capture first image data 550a of the second marker 530b and/or the first fixed marker 530c during and/or after the first robotic arm 502 is controlled to the first position.

The first image data 550a may be provided to the computer 560, and the computer 560 may reevaluate the location of the second marker 530b and/or the first fixed marker 530c in the first image data 550a. The computer 560 may compare the reevaluated location of the second marker 530b and/or the first fixed marker 530c to the first CAD data and the second CAD data associated with the first robotic arm 502, respectively, and the computer 560 may generate a next first set of instructions to compensate and/or correct for the position of the first robotic arm 502, thereby reducing the variance of the position of the first robotic arm 502 from the correct position at which the first robotic arm 502 is to be for an accurate connection of the node 580 with the part 582.

The computer 560 may provide the next first set of instructions to the first controller 542 to drive movement of the first robotic arm 502 to a second position corresponding to the next first set of instructions. The computer 560 may iteratively generate instructions based on first image data until the first robotic arm 502 is at a position at which the node 580 may be accurately connected with the part 582. The computer 560 may generate first sets of instructions while the first robotic arm 502 is in motion and/or when the first robotic arm 502 is stationary between movements performed according to first sets of instructions.

According to one embodiment, the second robotic arm 504 may be configured to move to bring the part 582 to the node 580 connected with the first robotic arm 502. Thus, the distal end 522 of the second robotic arm 504 may extend away from the base 524 and toward the distal end 512 of the first robotic arm 502, at which the node 580 is engaged. In one embodiment, the movement of the distal end 522 of the second robotic arm 504 may be at least approximately horizontal (e.g., parallel to the horizon); however, the movement of the distal end 522 of the second robotic arm 504 may be additionally or alternatively approximately vertical (e.g., perpendicular to the horizon).

The movement of the distal end 522 of the second robotic arm 504 toward the distal end 512 of the first robotic arm 502 may be caused by the second controller 544. The second controller 544 may cause the movement of the distal end 522 of the second robotic arm 504 based on the second set of instructions 552b provided by the computer 560.

When the part 582 is connected with the second robotic arm 504 (e.g., engaged with the end effector 528), the distal end 522 of the second robotic arm 504 may be positioned to accurately connect the part 582 with the node 580. To that end, the second camera 508b may capture second image data 550b of the first marker 530a and/or the second fixed marker 530d. Operations described herein with respect to the second fixed marker 530d captured in the second image data 550b may be similar when the first fixed marker 530c is captured in the second image data 550b (e.g., comparison to CAD data associated with the second robotic arm 504, etc.). In some embodiments, the first and second cameras 508a-b may be positioned so that both of the first and second cameras 508a-b capture image data 550a-b of at least one of the same one of the fixed markers 530c-d. Accordingly, the same fixed marker of the fixed markers 530c-d captured in both the first and second image data 550a-b may provide a common reference point and/or common frame of reference for both of the robotic arms 502, 504 in the assembly system 500.

The second camera 508b may provide the second image data 550b to the computer 560. For example, the computer 560 may issue a request to the second camera 508*b* to capture the second image data 550*b* or the second camera 508*b* may automatically capture the second image data 550*b* (e.g., when the second robotic arm 504 is at a fixed position and not moving, when the first marker 530*a* and/or the second fixed marker 530*d* is/are within the field of view of the second camera 508*b*, when the first marker 530*a* and/or second fixed marker 530*d* is/are activated, etc.).

Based on the second image data 550*b*, the computer 560 may generate at least one second set of instructions 552*b*. The computer 560 may determine the location of the first marker 530*a*, such as a set of numerical values indicating the location of the first marker 530*a* and/or a set of coordinates indicating the location of the first marker 530*a* in the second image data 550*b*. In one embodiment, the computer 560 may determine the actual location (e.g., absolute location) of the first marker 530*a* in space (e.g., three-dimensional space) in the second image data 550*b*. In another embodiment, the computer 560 may determine the relative location of the first marker 530*a* in the second image data 550*b*, e.g., with respect to the second robotic arm 504.

From the second image data 550*b*, the computer 560 may determine the location of the second fixed marker 530*d*, such as a set of numerical values indicating the location of the second fixed marker 530*d* and/or a set of coordinates indicating the location of the second fixed marker 530*d*. In one embodiment, the computer 560 may determine the actual location (e.g., absolute location) of the second fixed marker 530*d* in space (e.g., three-dimensional space) in the second image data 550*b*. In another embodiment, the computer 560 may determine the relative location of the second robotic arm 504 relative to the second fixed marker 530*d* in the second image data 550*b*.

Similar to operations described with respect to movement of the first robotic arm 502, the computer 560 may have stored therein or may be otherwise able to access a set of CAD data associated with the second robotic arm 504 (e.g., numerical CAD data and/or a set of coordinates based on CAD data). The set of CAD data associated with the second robotic arm 504 may indicate the position for second robotic arm 504 in order to accurately connect the part 582 with the node 580 (e.g., the "correct" position of the distal end 522 of the second robotic arm 504 in order for the part 582 to be accurately connected with the node 580).

In one embodiment, the computer 560 may determine the location of the first marker 530*a* in the second image data 550*b* relative to first CAD data associated with the second robotic arm 504 of the set of CAD data associated with the second robotic arm 504. For example, the computer 560 may compare the determined location of the first marker 530*a* in the second image data 550*b* to the first CAD data associated with the second robotic arm 504, and the computer 560 may determine (e.g., calculate) the difference between the determined location of the first marker 530*a* and the first CAD data associated with the second robotic arm 504.

The determined difference may indicate the variance between the actual position of the second robotic arm 504 in the assembly system 500 and the "correct" position of the second robotic arm 504 in the assembly system, wherein the "correct" position of the second robotic arm 504 in the assembly system may be the position of the second robotic arm 504 in order to reduce (or eliminate) the variance and accurately connect the part 582 with the node 580. The determined difference may be used for positional compensation(s) and/or positional correction(s) of the second robotic arm 504, the tool flange 526, and/or the end effector 528, thereby compensating and/or correcting the position of the part 582 to be accurate (e.g., within one or more thresholds commensurate with designed or acceptable tolerances).

In one embodiment, the computer 560 may determine the location of the second fixed marker 530*d* in the second image data 550*b* relative to second CAD data associated with the second robotic arm 504 of the set of CAD data associated with the second robotic arm 504. For example, the computer 560 may compare the determined location of the second fixed marker 530*d* to the second CAD data associated with the second robotic arm 504, and the computer 560 may determine (e.g., calculate) the difference between the determined location of the second fixed marker 530*d* and the second CAD data associated with the second robotic arm 504.

The determined difference may indicate the variance between the actual position of the second robotic arm 504 in the assembly system 500 and the "correct" position of the second robotic arm 504 in the assembly system, wherein the "correct" position of the second robotic arm 504 in the assembly system may be the position of the second robotic arm 504 in order to reduce (or eliminate) the variance and accurately connect the part 582 with the node 580. The determined difference may be used for positional compensation(s) and/or positional correction(s) of the second robotic arm 504, the tool flange 526, and/or the end effector 528, thereby compensating and/or correcting the position of the part 582 to be accurate (e.g., within one or more thresholds commensurate with designed or acceptable tolerances).

According to one embodiment, the determined location of the second fixed marker 530*d* may function as a reference point in order to provide a frame of reference and/or position of the second robotic arm 504 relative to a fixed and known point (i.e., the second fixed marker 530*d*). That is, the location of the second fixed marker 530*d* in the assembly system 500 may be known (e.g., stored in or otherwise accessible by the computer 560) and, therefore, the computer 560 may use the second fixed marker 530*d* in order to determine a position of the second robotic arm 504 in the assembly system 500. For example, the computer 560 may determine (e.g., calculate) the location of the second fixed marker 530*d* in the second image data 550*b*, and the computer 560 may derive the position of the second robotic arm 504 in the assembly system 500 based on the location of the second fixed marker 530*d* in the second image data 550*b* (e.g., the computer 560 may calculate the distance and/or direction of the second fixed marker 530*d* in the second image data 550*b* in order to derive the position of the second robotic arm 504).

Based on the determined location of the first marker 530*a*, the determined location of the second fixed marker 530*d*, the first CAD data associated with the second robotic arm 504, and/or the second CAD data associated with the second robotic arm 504, the computer 560 may determine a second set of instructions 552*b* that indicates a position to which the distal end 522 of the second robotic arm 504 is to move in order to accurately connect the part 582 with the node 580. For example, the second set of instructions 552*b* may indicate one or more movements that are to be performed by the second robotic arm 504 so that the distal end 522 of the second robotic arm 504 will be positioned for an accurate connection of the part 582 with the node 580. In one embodiment, the second set of instructions 552*b* may indicate one or more movements of the distal end 522 of the second robotic arm 504 so that the distal end 522 of the second robotic arm 504 will be at a position at which the variance from the first and/or second CAD data associated with the second robotic arm 504 may be satisfactorily low (e.g., within one or more thresholds of variance that is acceptable for an accurate connection of the part 582 with the node 580).

The computer 560 may generate the second set of instructions 552b to indicate one or more movements in one or more of 6DoF, including forward/backward (e.g., surge), up/down (e.g., heave), left/right (e.g., sway) for translation in space and including yaw, pitch, and roll for rotation in space. For one or more of the 6DoF, the tool flange 526 and/or the end effector 528 may perform one or more movements. For example, the computer 560 may generate the second set of instructions 552b to cause the tool flange 526 and/or the end effector 528 to rotate and/or translate in space.

The computer 560 may provide the generated second set of instructions 552b to the second controller 544. For example, the computer 560 may indicate, to the switch 562, that the second set of instructions 552b is to be provided to the second controller 544, and the switch 562 may cause the second set of instructions 552b to be sent over the third connection 566a to the second controller 544.

Accordingly, the second controller 544 may drive movement of the second robotic arm 504 based on the second set of instructions 552b. For example, the second controller 544 may drive movement of the second robotic arm 504, thereby causing the distal end 522 of the second robotic arm 504 to move into a position indicated by the second set of instructions 552b. Thus, the second robotic arm 504 may be positioned relative to the first marker 530a and/or the second fixed marker 530d. Correspondingly, the second robotic arm 504 may move the tool flange 526, the end effector 528, and the part 582 into a position corresponding to the second set of instructions 552b.

Based on the second set of instructions 552b, the second robotic arm 504 may cause the part 582 to contact the node 580 that is engaged with the end effector 518 connected with the first robotic arm 502. When the part 582 is accurately contacting the node 580 (e.g., within designed or acceptable tolerances), the part 582 may be connected with the node 580 in order to form a portion of a node-based transport structure (e.g., without any fixtures). For example, the second robotic arm 504 and/or the end effector 528 may cause the part 582 to be extended toward the node 580 and, when the part 582 is contacting the node 580, pressure may be applied until at least one feature (e.g., a male/extension feature, a female/reception feature, etc.) of the part 582 is securely engaged with at least one feature (e.g., a correspondingly opposing one of a female/reception feature, a male/extension feature, etc.) of the node 580.

As aforementioned, the computer 560 may generate a plurality of second sets of instructions. Each second set of instructions may be dynamically generated in association with the movement of the second robotic arm 504. For example, the computer 560 may generate one second set of instructions 552b that causes the second controller 544 to drive movement of the second robotic arm 504 into a first position. The second camera 508b may capture second image data 550b of the first marker 530a and/or the second fixed marker 530d during and/or after the second robotic arm 504 is controlled to the first position.

The second image data 550b may be provided to the computer 560, and the computer 560 may reevaluate the location of the first marker 530a and/or the second fixed marker 530d in the second image data 550b. The computer 560 may compare the reevaluated location of the first marker 530a and/or the second fixed marker 530d to the first CAD data associated with the second robotic arm 504 and the second CAD data associated with the second robotic arm 504, respectively, and the computer 560 may generate a next second set of instructions to compensate and/or correct for the position of the second robotic arm 504, thereby reducing the variance of the position of the second robotic arm 504 from the correct position at which the second robotic arm 504 is to be for an accurate connection of the part 582 with the node 580.

The computer 560 may provide the next second set of instructions to the second controller 544 to drive movement of the second robotic arm 504 to a second position corresponding to the next second set of instructions. The computer 560 may iteratively generate instructions based on second image data until the second robotic arm 504 is at a position at which the part 582 may be accurately connected with the node 580. The computer 560 may generate second sets of instructions while the second robotic arm 504 is in motion and/or when the second robotic arm 504 is stationary between movements performed according to second sets of instructions.

FIGS. 4 and 5 illustrate assembly systems 400, 500 with two robotic arms 402, 404 and 502, 504, respectively. In other embodiments, one or both of the assembly systems 400, 500 may include more than two robotic arms without departing from the scope of the present disclosure. For example, a third robotic arm may be located approximately ninety degrees to the right of the first robotic arm 402 and approximately ninety degrees to the left of the second robotic arm 404 in the assembly system 400. The third robotic arm may be similarly connected with at least one of a camera or a marker, e.g., to capture image data of the marker 430, to capture image data of another marker (potentially located on a fourth robotic arm), provide a reference point for the camera 408, provide a reference point for another camera (potentially located on a fourth robotic arm), etc.

Figure 6:
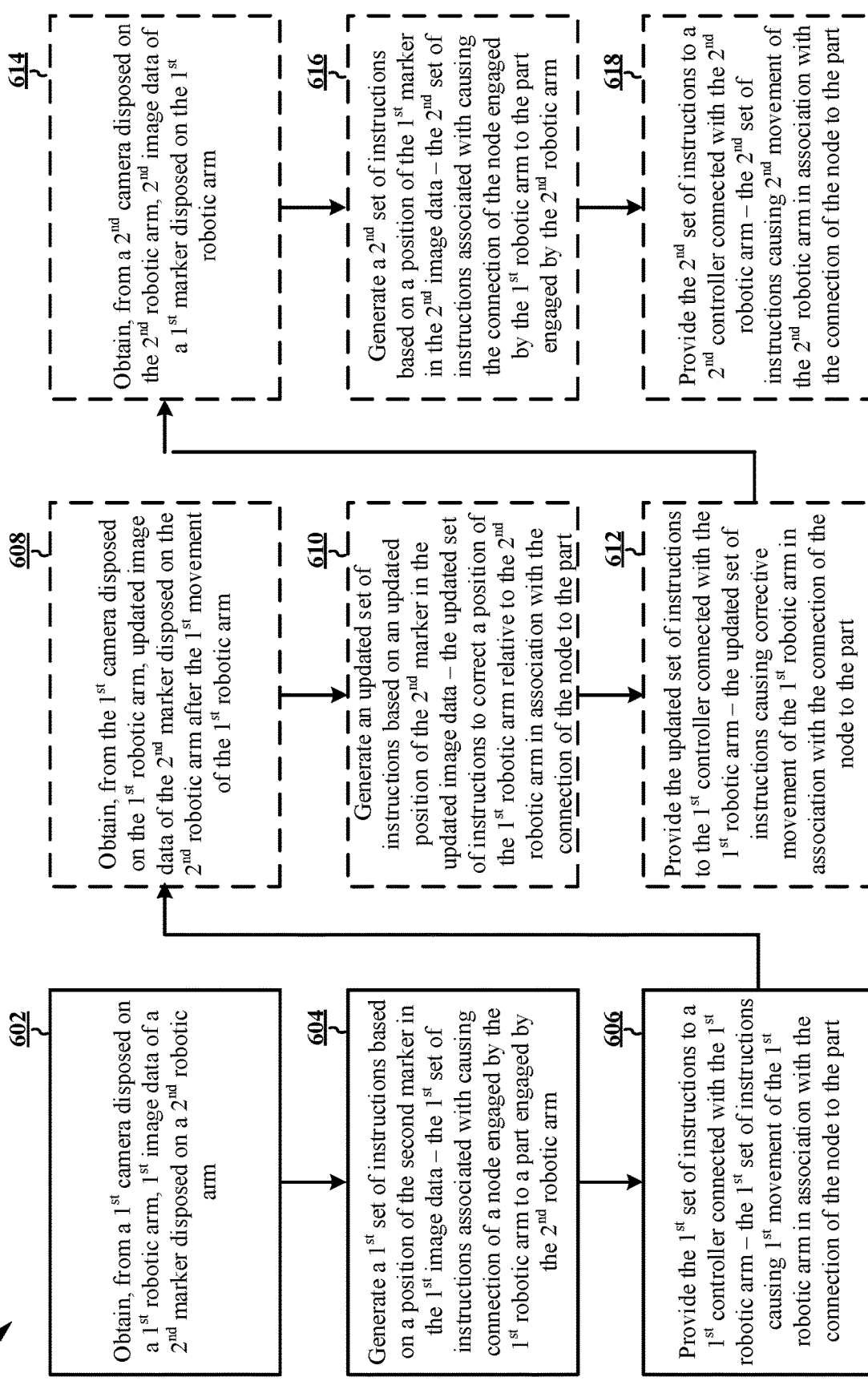
FIG. 6 illustrates a method of positioning at least one robotic arm in an assembly system.

FIG. 6 is a flow diagram of a method 600 of operating an assembly system including at least one robotic arm. One or more of the illustrated operations may be transposed, omitted, and/or contemporaneously performed.

The method 600 may be performed in an assembly system, such as the assembly system 400 of FIG. 4 and/or the assembly system 500 of FIG. 5. In some embodiments, a computer may perform the method 600, such as the computer 460 of FIG. 4 and/or the computer 560 of FIG. 5. A computer performing the method 600 may include a memory and at least one processor coupled to the memory, and the at least one processor may be configured to perform the operations of the method 600. The computer performing the method 600 may be communicatively coupled with one or more of a switch (e.g., the switch 462, the switch 562), a first controller (e.g., the first controller 442, the first controller 542), a second controller (e.g., the second controller 444, the second controller 544), a first robotic arm (e.g., the first robotic arm 402, the first robotic arm 502), and/or a second robotic arm (e.g., the second robotic arm 404, the second robotic arm 504). The computer may be communicatively coupled with one or more of the aforementioned components via one or more networks (e.g., one or more of the connections 464a-b, 466a-b, 564a-b, 566a-b).

The computer may obtain, from a first camera disposed on a first robotic arm, first image data of a second marker disposed on a second robotic arm (operation 602). In some embodiments, the computer may obtain first image data of a fixed marker (e.g., in addition to the second marker), and the computer may use the fixed marker in the first image data as a reference point and/or frame of reference for the first robotic arm.

The computer may generate a first set of instructions based on a position of the second marker in the first image data (operation 604). The first set of instructions may be associated with one or more assembly and/or pre-/post-assembly operations, such as causing connection of a node engaged by the first robotic arm to a part engaged by the second robotic arm. In some embodiments, the computer may further generate the first set of instructions based on a position of the fixed marker in the first image data. For example, the computer may use the fixed marker in the first image data as a reference point and/or frame of reference with respect to the first robotic arm.

The computer may provide the first set of instructions to a first controller connected with the first robotic arm (operation 606). The first set of instructions may cause first movement of the first robotic arm in association with one or more assembly and/or pre-/post-assembly operations, such as causing connection of a node engaged by the first robotic arm to a part engaged by the second robotic arm.

In some embodiments, the computer may further obtain, from the first camera disposed on the first robotic arm, updated image data of the second marker disposed on the second robotic arm after the first movement of the first robotic arm (operation 608). In addition to the updated image data of the second marker, the computer may obtain updated image data of the fixed marker.

The computer may generate an updated set of instructions based on an updated position of the second marker in the updated image data (operation 610). In some embodiments, the computer may generate the updated set of instructions further based on the fixed marker, which may provide a reference point and/or frame of reference of the first robotic arm in the assembly system. The updated set of instructions may compensate or correct a position of the first robotic arm in association with one or more assembly and/or pre-/post-assembly operations, such as causing connection of the node engaged by the first robotic arm to the part engaged by the second robotic arm.

The computer may provide the updated set of instructions to the first controller connected with the first robotic arm (operation 612). The updated set of instructions may cause corrective movement of the first robotic arm in association with one or more assembly and/or pre-/post-assembly operations, such as causing connection of the node engaged by the first robotic arm to the part engaged by the second robotic arm.

In some embodiments, the computer may further obtain, from a second camera disposed on the second robotic arm, second image data of a first marker disposed on the first robotic arm (operation 614). In some embodiments, the computer may obtain second image data of a fixed marker (e.g., the same fixed marker captured in the first image data or a different fixed marker), and the computer may use the fixed marker in the second image data as a reference point and/or frame of reference for the second robotic arm.

The computer may generate a second set of instructions based on a position of the first marker in the second image data (operation 616). The second set of instructions may be associated with one or more assembly and/or pre-/post-assembly operations, such as causing connection of the node engaged by the first robotic arm to the part engaged by the second robotic arm. In some embodiments, the computer may further generate the second set of instructions based on a position of the fixed marker in the second image data. For example, the computer may use the fixed marker captured in the second image data as a reference point and/or frame of reference with respect to the second robotic arm.

The computer may provide the second set of instructions to a second controller connected with the second robotic arm (operation 618). The second set of instructions may cause second movement of the second robotic arm in association with one or more assembly and/or pre-/post-assembly operations, such as causing connection of the node engaged by the first robotic arm to the part engaged by the second robotic arm.

In causing the movement(s) to the first robotic arm (and the second robotic arm in some embodiments), the computer may cause the first robotic arm (and potentially the second robotic arm) to be correctly positioned for one or more assembly and/or pre-/post-assembly operations, such as causing connection of the node engaged by the first robotic arm to the part engaged by the second robotic arm. Accordingly, positional correction for at least one robotic arm in an assembly system may be described herein.

The present disclosure is provided to enable any person skilled in the art to practice the various aspects described herein. Various modifications to these exemplary embodiments presented throughout the present disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout the present disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus comprising:
   a computer;
   a first robotic arm having a distal end and a proximal end, the distal end being configured for movement and the proximal end securing the first robotic arm;
   a camera connected with the distal end of the first robotic arm, the camera being configured to capture image data of a passive marker connected with a second robotic arm and provide the image data to the computer; and
   one or more fixed markers disposed at different locations and unconnected with the first and second robotic arms, the camera being configured to capture image data of the one or more fixed markers and provide the image data of the one or more fixed markers to the computer;
   wherein at least one of the one or more fixed markers is an active marker,
   wherein the computer is configured to:
      determine a variance between an actual position of the first robotic arm based on the image data of the passive marker and the one or more fixed markers, and a correct position of the first robotic arm based on a first data model associated with both the first robotic arm and the passive marker, and a second data model associated with both the first robotic arm and the one or more fixed markers, and determine a set of instructions that indicate one or more movements of the first robotic arm to position the distal end of the first robotic arm at the correct position based on the variance, and wherein the movement of the first robotic arm is caused by the computer based on the determined set of instructions.

2. The apparatus of claim 1, further comprising:
a controller configured to receive the determined set of instructions from the computer and configured to drive the movement of the first robotic arm based on the instructions.

3. The apparatus of claim 1, further comprising:
a tool flange connected with the distal end of the first robotic arm; and
an end effector connected with the tool flange and configured to engage with a node,
wherein the camera is connected with the distal end of the first robotic arm through the end effector and the tool flange.

4. The apparatus of claim 1, wherein each active marker is configured to change at least one of a color.

5. The apparatus of claim 1, wherein each active marker is configured to change at least one of a luminous intensity.

6. The apparatus of claim 1, wherein the computer is configured to:
determine a variance between an actual position of the second robotic arm based on the image data of a passive marker disposed on the distal end of the first robotic arm and the one or more fixed markers, and a correct position of the second robotic arm based on a first data model associated with both the second robotic arm and the passive marker disposed on the distal end of the first robotic arm, and a second data model associated with both the second robotic arm and the one or more fixed markers; and
determine a second set of instructions that indicate one or more movements of the second robotic arm to position the distal end of the second robotic arm at the correct location based on the variance,
wherein the movement of the second robotic arm is caused by the computer based on the second determined set of instructions.

7. The apparatus of claim 1, wherein at least one of the first data model and the second data model include computer-aided design (CAD) data.

8. A system comprising:
a computer;
a first robotic arm having a first camera disposed on a distal end of the first robotic arm;
a first controller connected with the first robotic arm and configured to cause movement of the first robotic arm;
a second robotic arm having a passive marker connected to a distal end of the second robotic arm; and
one or more fixed markers disposed at different locations and unconnected with the first and second robotic arms and wherein at least one of the one or more fixed markers is an active marker;
wherein the first camera is positioned such that the passive marker is within a field of view of the first camera, the first camera being configured to capture first image data of the passive marker and of the one or more fixed markers and provide the first image data to the computer configured to determine a first variance between an actual position of the first robotic arm based on the image data of the passive marker and the one or more fixed markers, and a correct position of the first robotic arm based on a first data model associated with both the first robotic arm and the passive marker, and a second data model associated with both the first robotic arm and the one or more fixed markers, and the first controller being configured to cause the movement of the first robotic arm based on a first set of instructions obtained from the computer that are determined, based on the variance.

9. The system of claim 8, further comprising;
a first tool flange connected with the distal end of the first robotic arm; and
a first end effector connected with the first tool flange and configured to engage with a node,
wherein the first camera is connected with the distal end of the first robotic arm through the first end effector and the first tool flange.

10. The system of claim 8, further comprising:
a second controller connected with the second robotic arm and configured to cause movement of the second robotic arm,
wherein the first robotic arm includes a passive marker disposed on the distal end of the first robotic arm and the second robotic arm includes a second camera disposed on the distal end of the second robotic arm, the second camera being configured to capture second image data of the passive marker disposed on the distal end of the first robotic arm and provide the second image data to the computer configured to determine a second variance between an actual position of the second robotic arm based on the image data of the passive marker disposed on the distal end of the first robotic arm and the one or more fixed markers, and a correct position of the second robotic arm based on a first data model associated with the second robotic arm and the passive marker disposed on the distal end of the first robotic arm and a second data model associated with the second robotic arm and the one or more fixed markers, and the second controller being configured to cause the movement of the second robotic arm based on a second set of instructions obtained from the computer, that are determined based on the second variance.

11. The system of claim 10, wherein the first camera is positioned such that the one or more fixed markers are within the field of view of the first camera.

12. The system of claim 10, further comprising:
a second tool flange connected with the distal end of the second robotic arm; and
a second end effector connected with the second tool flange and configured to engage with a part,
wherein the second camera is connected with the distal end of the second robotic arm through the second end effector and the second tool flange.

13. The system of claim 10, further comprising:
a switch connected with the first controller and the second controller, wherein the switch is configured to provide the first set of instructions obtained from the computer to the first controller or the second set of instructions obtained from the computer to the second controller.

14. The system of claim 8, wherein the second robotic arm is stationary.

15. The system of claim 8, wherein each active marker is configured to change at least one of a color or a luminous intensity.

16. An apparatus comprising:
a memory; and
at least one processor coupled to the memory and configured to:
- obtain, from a first camera disposed on a first robotic arm, first image data of a first passive marker connected to a second robotic arm and one or more fixed markers disposed at different locations and unconnected with the first and second robotic arms, wherein at least one of the one or more fixed markers is an active marker;
- access a first data model and a second data model associated with the first robotic arm;
- determine the respective location of the first passive marker in the first image data relative to the first data model and determine the respective location of the one or more fixed markers in the first image data relative to the second data model;
- determine a variance between an actual position of the first robotic arm based on the determined respective locations of the passive marker and the one or more fixed markers, and a position that causes the connection of a node engaged by the first robotic arm to a part engaged by the second robotic arm;
- generate a first set of instructions based on the variance; and
- provide the first set of instructions to a first controller connected with the first robotic arm, wherein the first set of instructions causes first movement of the first robotic arm in association with the connection of the node to the part.

17. The apparatus of claim 16, wherein the at least one processor is further configured to:
- obtain, from the first camera disposed on the first robotic arm, updated image data of the first passive marker disposed on the second robotic arm after the first movement of the first robotic arm;
- generate an updated set of instructions based on an updated position of the first passive marker in the updated image data, the updated set of instructions configured to correct a position of the first robotic arm relative to the second robotic arm in association with the connection of the node to the part; and
- provide the updated set of instructions to the first controller connected with the first robotic arm, wherein the updated set of instructions causes corrective movement of the first robotic arm in association with the connection of the node to the part.

18. The apparatus of claim 16, wherein the at least one processor is further configured to:
- obtain, from a second camera disposed on the second robotic arm, second image data of a second passive marker disposed on the first robotic arm and the one or more fixed markers;
- generate a second set of instructions based on a position of the second passive marker in the second image data and a position of each of the one or more fixed markers in the second image data, the second set of instructions associated with causing the connection of the node engaged by the first robotic arm to the part engaged by the second robotic arm; and
- provide the second set of instructions to a second controller connected with the second robotic arm, wherein the second set of instructions causes second movement of the second robotic arm in association with the connection of the node to the part.

19. The apparatus of claim 18, wherein the first set of instructions are based on the one or more fixed markers as a reference point.

20. The apparatus of claim 18, wherein the at least one processor is further configured to:
- access a first data model and a second data model associated with the second robotic arm;
- determine the respective location of the second passive marker in the second image data relative to the first data model associated with the second robotic arm and determine the respective location of the one or more fixed markers in the second image data relative to the second data model associated with the second robotic arm; and
- determine a variance between an actual position of the second robotic arm and a position that causes the connection of the node engaged by the first robotic arm to the part engaged by the second robotic arm.

* * * * *